US010563928B2

(12) United States Patent
Noureldin et al.

(10) Patent No.: US 10,563,928 B2
(45) Date of Patent: Feb. 18, 2020

(54) NATURAL GAS LIQUID FRACTIONATION PLANT WASTE HEAT CONVERSION TO SIMULTANEOUS POWER AND COOLING CAPACITIES USING MODIFIED GOSWAMI SYSTEM

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 161 days.

(21) Appl. No.: 15/842,567

(22) Filed: Dec. 14, 2017

(65) Prior Publication Data

US 2019/0049193 A1  Feb. 14, 2019

Related U.S. Application Data

(60) Provisional application No. 62/542,687, filed on Aug. 8, 2017.

(51) Int. Cl.
*F28D 21/00* (2006.01)
*B01D 53/34* (2006.01)
(Continued)

(52) U.S. Cl.
CPC ....... *F28D 21/0001* (2013.01); *B01D 53/343* (2013.01); *F01K 25/08* (2013.01);
(Continued)

(58) Field of Classification Search
CPC .................................................. F01K 25/08
See application file for complete search history.

(56) References Cited

U.S. PATENT DOCUMENTS 4,907,410 A   3/1990  Chang
5,600,049 A   2/1997  Sy
(Continued)

FOREIGN PATENT DOCUMENTS

| WO | 2006039182 | 4/2006 |
|----|------------|--------|
| WO | 2012003525 | 1/2012 |
| WO | 2017035166 | 3/2017 |

OTHER PUBLICATIONS

International Search Report and Written Opinion issued in International Application No. PCT/US2018/045554 dated Nov. 22, 2018, 21 pages.

(Continued)

*Primary Examiner* — Laert Dounis
(74) *Attorney, Agent, or Firm* — Fish & Richardson P.C.

(57) ABSTRACT

Certain aspects of natural gas liquid fractionation plant waste heat conversion to simultaneous power and cooling capacities using modified Goswami system can be implemented as a system. The system includes a waste heat recovery heat exchanger configured to heat a buffer fluid stream by exchange with a heat source in a natural gas liquid fractionation plant. The system includes a modified Goswami cycle energy conversion system including one or more first energy conversion system heat exchangers configured to heat a working fluid by exchange with the heated buffer fluid stream, a separator configured to receive the heated working fluid and to output a vapor stream of the working fluid and the liquid stream of the working fluid, a turbine and a generator, wherein the turbine and generator are configured to generate power by expansion of a first portion of the vapor stream of the working fluid, and a cooling subsystem including a cooling element configured to cool a process fluid stream from the natural gas liquid fractionation plant (Continued)

by exchange with a condensed second portion of the vapor stream of the working fluid.

62 Claims, 16 Drawing Sheets

(51) Int. Cl.

| | | |
|---|---|---|
| *F01K 25/08* | (2006.01) | |
| *B01D 53/00* | (2006.01) | |
| *B01D 53/14* | (2006.01) | |
| *B01D 53/26* | (2006.01) | |
| *F01K 27/02* | (2006.01) | |

(52) U.S. Cl.
CPC ............ *F01K 27/02* (2013.01); *B01D 53/002* (2013.01); *B01D 53/1456* (2013.01); *B01D 53/263* (2013.01); *F28D 2021/0075* (2013.01)

(56) References Cited

U.S. PATENT DOCUMENTS

| | | | | |
|---|---|---|---|---|
| 5,685,152 | A | 11/1997 | Sterling | |
| 6,216,436 | B1 | 4/2001 | Ranasinghe | |
| 7,257,966 | B2 | 8/2007 | Lee et al. | |
| 7,458,231 | B1 | 12/2008 | Vanden | |
| 8,776,703 | B2 | 7/2014 | Hall | |
| 9,598,993 | B2 | 3/2017 | Younes et al. | |
| 9,657,937 | B2 | 5/2017 | Niass | |
| 9,745,871 | B2 | 8/2017 | Noureldin et al. | |
| 9,828,885 | B2 | 11/2017 | Noureldin et al. | |
| 9,851,153 | B2 | 12/2017 | Noureldin et al. | |
| 9,879,918 | B2 | 1/2018 | Noureldin et al. | |
| 9,891,004 | B2 | 2/2018 | Noureldin et al. | |
| 2006/0065015 | A1 | 3/2006 | Mccoy | |
| 2008/0174115 | A1* | 7/2008 | Lambirth | E21B 36/04 290/2 |
| 2008/0190135 | A1 | 8/2008 | Mak | |
| 2010/0326131 | A1* | 12/2010 | Lengert | F01K 25/065 62/512 |
| 2011/0000205 | A1* | 1/2011 | Hauer | F01K 25/065 60/511 |
| 2013/0341929 | A1* | 12/2013 | Ho | F01K 25/08 290/54 |
| 2014/0223911 | A1* | 8/2014 | Ikegami | F01K 25/065 60/671 |
| 2015/0377079 | A1 | 12/2015 | Noureldin et al. | |
| 2016/0369674 | A1 | 12/2016 | Younes et al. | |
| 2017/0058708 | A1* | 3/2017 | Noureldin | F01K 21/005 |
| 2017/0058711 | A1 | 3/2017 | Noureldin et al. | |
| 2017/0058719 | A1* | 3/2017 | Noureldin | F01K 25/065 |
| 2017/0058721 | A1* | 3/2017 | Noureldin | C10G 69/00 |
| 2019/0048759 | A1* | 2/2019 | Noureldin | F25B 27/02 |

OTHER PUBLICATIONS

International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018, 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018, 20 pages.
International Search Report and Written Opinion issued in International Application No. PCT/US2018/045640 dated Nov. 22, 2018, 19 pages.
International Search Report and Written Opinion issued in International Application No. PCT/US2018/045535 dated Nov. 22, 2018, 23 pages.
International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Bahnassi et al., "Achieving product specifications for ethane through to pentane plus from NGL fraction plants," AIChE Fall Conference, Jan. 1, 2005, 21 pages.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry Research, vol. 53, No. 7, Feb. 4, 2014, 19 pages.
Ammar et al., "Low grade thermal energy sources and uses from the process industry in the UK," Applied Energy, Elsevier Science Publishers, vol. 89, No. 1, Jun. 1, 2011, 18 pages.
Gaberiel et al., "Optimization across the water-energy nexus for integrating heat, power, and water for industrial processes, couples with the hybrid thermal-membrane dealination," Industrial and Engineering Chemistry Research, vol. 55, No. 12, Feb. 16, 2016, 25 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Ophir et al., "Advanced MED process for most economical sea water desalination," Desalination, Elsevier, Amsterdam, NL, vol. 182, No. 1-3, Nov. 1, 2005, 12 pages.
Gnaneswar Gude et al., "Feasibility study of a new two-stage low temperature desalination process," Energy Conversation and Management, Elsevier Science Publishers, vol. 56, Nov. 30, 2011, 7 pages.
M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.
Rahimi et al., "A novel process for low grade heat driven desalination," Desalination, Oct. 15, 2014, vol. 351, pp. 202-212.
Zhu et al., "Hybrid vapor compression refrigeration system with an integrated ejector cooling cycle," International Journal of Refrigeration, vol. 35, 2012, 11 pages.

\* cited by examiner

NATURAL GAS LIQUID FRACTIONATION PLANT WASTE HEAT CONVERSION TO SIMULTANEOUS POWER AND COOLING CAPACITIES USING MODIFIED GOSWAMI SYSTEM

CROSS-REFERENCE TO RELATED APPLICATIONS

This disclosure claims the benefit of priority to U.S. Application Ser. No. 62/542,687 entitled "Utilizing Waste Heat Recovered From Natural Gas Liquid Fractionation Plants", which was filed on Aug. 8, 2017, the entire contents of which are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
|---|---|
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |
| Cubic meters per day | m³/day |
| Fahrenheit | F. |

Certain aspects of the subject matter described here can be implemented as a system. The system includes a waste heat recovery heat exchanger configured to heat a buffer fluid stream by exchange with a heat source in a natural gas liquid fractionation plant. The system includes a modified Goswami cycle energy conversion system including one or more first energy conversion system heat exchangers configured to heat a working fluid by exchange with the heated buffer fluid stream, a separator configured to receive the heated working fluid and to output a vapor stream of the working fluid and the liquid stream of the working fluid, a turbine and a generator, wherein the turbine and generator are configured to generate power by expansion of a first portion of the vapor stream of the working fluid, and a cooling subsystem including a cooling element configured to cool a process fluid stream from the natural gas liquid fractionation plant by exchange with a condensed second portion of the vapor stream of the working fluid.

This, and other aspects, can include one or more of the following features. The cooling subsystem is configured to produce at least 300 MM Btu/h of cooling capacity for the natural gas liquid fractionation plant. The second cooling element is configured to cool ethane gas output from a deethanizer in the natural gas liquid fractionation plant. The second cooling element comprises a chiller having a thermal duty of between 350 MM Btu/h and 450 MM Btu/h. The first cooling element comprises a cooler having a thermal duty of between 450 Btu/h and 550 Btu/h. The first cooling element comprises a valve. The valve is configured to condense the working fluid to a pressure of between 4 Bar and 5 Bar and a temperature of between 30° F. and 50° F. The turbine and generator are configured to generate at least 15 MW of power. The one or more first energy conversion heat exchangers includes an energy conversion heat exchanger having a thermal duty of between 400 MM Btu/h and 500 MM Btu/h and an energy conversion heat exchanger having a thermal duty of between 1000 MM Btu/h and about 1500 MM Btu/h. The one or more first energy conversion heat exchangers are configured to heat the first portion of the working fluid to a temperature of between 160° F. and 180° F. The one or more first energy conversion heat exchangers are configured to heat a first portion of the working fluid. The Kalina cycle energy conversion system comprises one or more second energy conversion heat exchangers configured to heat a second portion of the working fluid, the second by exchange with the liquid stream of the working fluid. The separator is configured to receive the heated first and second portions of the working fluid. The one or more second energy conversion heat exchangers are configured to heat the second portion of the working fluid by exchange with the heated buffer fluid stream. The one or more second energy conversion heat exchangers include an energy conversion heat exchanger having a thermal duty of between 550 MM Btu/h and 650 MM Btu/h and an energy conversion heat exchanger having a thermal duty of between 1100 MM Btu/h and about 1200 MM Btu/h. The one or more second energy conversion heat exchangers are configured to heat the second portion of the working fluid to a temperature of between 160° F. and 180° F. A second turbine configured to generate power from the liquid stream of the working fluid. The second turbine comprises a high pressure recovery turbine. The waste heat recovery heat exchanger is configured to heat the buffer fluid stream by exchange with a refrigerant in the natural gas liquid fractionation plant. The refrigerant is used to cool ethane gas output from a deethanizer in the natural gas liquid fractionation plant. The waste heat recovery heat exchanger is configured to heat the buffer fluid stream by exchange with propane gas output from a depropanizer in the natural gas liquid fractionation plant. The waste heat recovery heat exchanger is configured to heat the buffer fluid stream by exchange with propane gas output from a propane dehydrator in the natural gas liquid fractionation plant. The waste heat recovery heat exchanger is configured to heat the buffer fluid stream by exchange with a C5+ bottoms product from a debutanizer in the natural gas liquid fractionation plant. The waste heat recovery heat exchanger is configured to heat the buffer fluid stream by exchange with butane gas output from a debutanizer in the natural gas liquid fractionation plant. The waste heat recovery heat exchanger is configured to heat the buffer fluid stream by exchange with butane gas output from a butane dehydrator in the natural gas liquid fractionation plant. The waste heat recovery heat exchanger is configured to heat the buffer fluid stream by exchange with pentane gas output from a depentanizer in the natural gas liquid fractionation plant. The waste heat recovery exchanger is configured to heat the buffer fluid stream by exchange with acid gases output from an ADIP generator in the natural gas liquid fractionation plant. The waste heat recovery exchanger is configured to heat the buffer fluid stream by exchange with lean ADIP output from an ADIP generator in the natural gas liquid fractionation plant. The waste heat recovery exchanger is configured to heat the buffer fluid stream by exchange with light NG components output from a pre-flash drum in a decolorizing section of the natural gas liquid fractionation plant. The waste heat recovery exchanger is configured to heat the buffer fluid stream by exchange with compressed propane in the natural gas liquid fractionation plant. The waste heat recovery exchanger is configured to heat the buffer fluid stream by exchange with compressed butane in the natural gas liquid fractionation plant. The waste heat recovery exchanger is configured to heat the buffer fluid stream by exchange with dry ethane gas in the natural gas liquid fractionation plant. The waste heat recovery exchanger is configured to heat the buffer fluid stream by exchange with pentane gas output from an RVP column in the natural gas liquid fractionation plant.

Certain aspects of the subject matter described here can be implemented as a method. A buffer fluid stream is heated via a waste heat recovery heat exchanger by exchange with a heat source in a natural gas liquid fractionation plant. Power and cooling capacity are generated in a modified Goswami cycle energy conversion system. To do so, a first portion of a working fluid is heated via a first set of one or more energy conversion heat exchangers by exchange with the heated buffer fluid stream. A second portion of a working fluid is heated via a second set of one or more energy conversion heat exchangers, including buffer the second portion of the working fluid via a first heat exchanger by exchange with a liquid stream of the working fluid. In a separator, the heated first and second portions of the working fluid are heated into a vapor stream of the working fluid and the liquid stream of the working fluid. With a turbine and generator, power is generated, by expansion of a first portion of the vapor stream of the working fluid. A process fluid stream from the natural gas liquid fractionation plant is cooled by exchange with a condensed second portion of the vapor stream of the working fluid.

This, and other aspects, can include one or more of the following features. The cooling subsystem is configured to produce at least 300 MM Btu/h of cooling capacity for the natural gas liquid fractionation plant. The second cooling element is configured to cool ethane gas output from a deethanizer in the natural gas liquid fractionation plant. The second cooling element comprises a chiller having a thermal duty of between 350 MM Btu/h and 450 MM Btu/h. The first cooling element comprises a cooler having a thermal duty of between 450 Btu/h and 550 Btu/h. The first cooling element comprises a valve. The valve is configured to condense the working fluid to a pressure of between 4 Bar and 5 Bar and a temperature of between 30° F. and 50° F. The turbine and generator are configured to generate at least 15 MW of power. The one or more first energy conversion heat exchangers includes an energy conversion heat exchanger having a thermal duty of between 400 MM Btu/h and 500 MM Btu/h and an energy conversion heat exchanger having a thermal duty of between 1000 MM Btu/h and about 1500 MM Btu/h. The one or more first energy conversion heat exchangers are configured to heat the first portion of the working fluid to a temperature of between 160° F. and 180° F. The one or more first energy conversion heat exchangers are configured to heat a first portion of the working fluid. The Kalina cycle energy conversion system comprises one or more second energy conversion heat exchangers configured to heat a second portion of the working fluid, the second by exchange with the liquid stream of the working fluid. The separator is configured to receive the heated first and second portions of the working fluid. The one or more second energy conversion heat exchangers are configured to heat the second portion of the working fluid by exchange with the heated buffer fluid stream. The one or more second energy conversion heat exchangers include an energy conversion heat exchanger having a thermal duty of between 550 MM Btu/h and 650 MM Btu/h and an energy conversion heat exchanger having a thermal duty of between 1100 MM Btu/h and about 1200 MM Btu/h. The one or more second energy conversion heat exchangers are configured to heat the second portion of the working fluid to a temperature of between 160° F. and 180° F. A second turbine configured to generate power from the liquid stream of the working fluid. The second turbine comprises a high pressure recovery turbine. The waste heat recovery heat exchanger is configured to heat the buffer fluid stream by exchange with a refrigerant in the natural gas liquid fractionation plant. The refrigerant is used to cool ethane gas output from a deethanizer in the natural gas liquid fractionation plant. The waste heat recovery heat exchanger is configured to heat the buffer fluid stream by exchange with propane gas output from a depropanizer in the natural gas liquid fractionation plant. The waste heat recovery heat exchanger is configured to heat the buffer fluid stream by exchange with propane gas output from a propane dehydrator in the natural gas liquid fractionation plant. The waste heat recovery heat exchanger is configured to heat the buffer fluid stream by exchange with a C5+ bottoms product from a debutanizer in the natural gas liquid fractionation plant. The waste heat recovery heat exchanger is configured to heat the buffer fluid stream by exchange with butane gas output from a debutanizer in the natural gas liquid fractionation plant. The waste heat recovery heat exchanger is configured to heat the buffer fluid stream by exchange with butane gas output from a butane dehydrator in the natural gas liquid fractionation plant. The waste heat recovery heat exchanger is configured to heat the buffer fluid stream by exchange with pentane gas output from a depentanizer in the natural gas liquid fractionation plant. The waste heat recovery exchanger is configured to heat the buffer fluid stream by exchange with acid gases output from an ADIP generator in the natural gas liquid fractionation plant. The waste heat recovery exchanger is configured to heat the buffer fluid stream by exchange with lean ADIP output from an ADIP generator in the natural gas liquid fractionation plant. The waste heat recovery exchanger is configured to heat the buffer fluid stream by exchange with light NG components output from a pre-flash drum in a decolorizing section of the natural gas liquid fractionation plant. The waste heat recovery exchanger is configured to heat the buffer fluid stream by exchange with compressed propane in the natural gas liquid fractionation plant. The waste heat recovery exchanger is configured to heat the buffer fluid stream by exchange with compressed butane in the natural gas liquid fractionation plant. The waste heat recovery exchanger is configured to heat the buffer fluid stream by exchange with dry ethane gas in the natural gas liquid fractionation plant. The waste heat recovery exchanger is configured to heat the buffer fluid stream by exchange with pentane gas output from an RVP column in the natural gas liquid fractionation plant.

The details of one or more implementations of the subject matter described in this specification are set forth in the accompanying drawings and the detailed description. Other features, aspects, and advantages of the subject matter will become apparent from the description, the drawings, and the claims.

DETAILED DESCRIPTION

NGL Plant

Figure 1A:
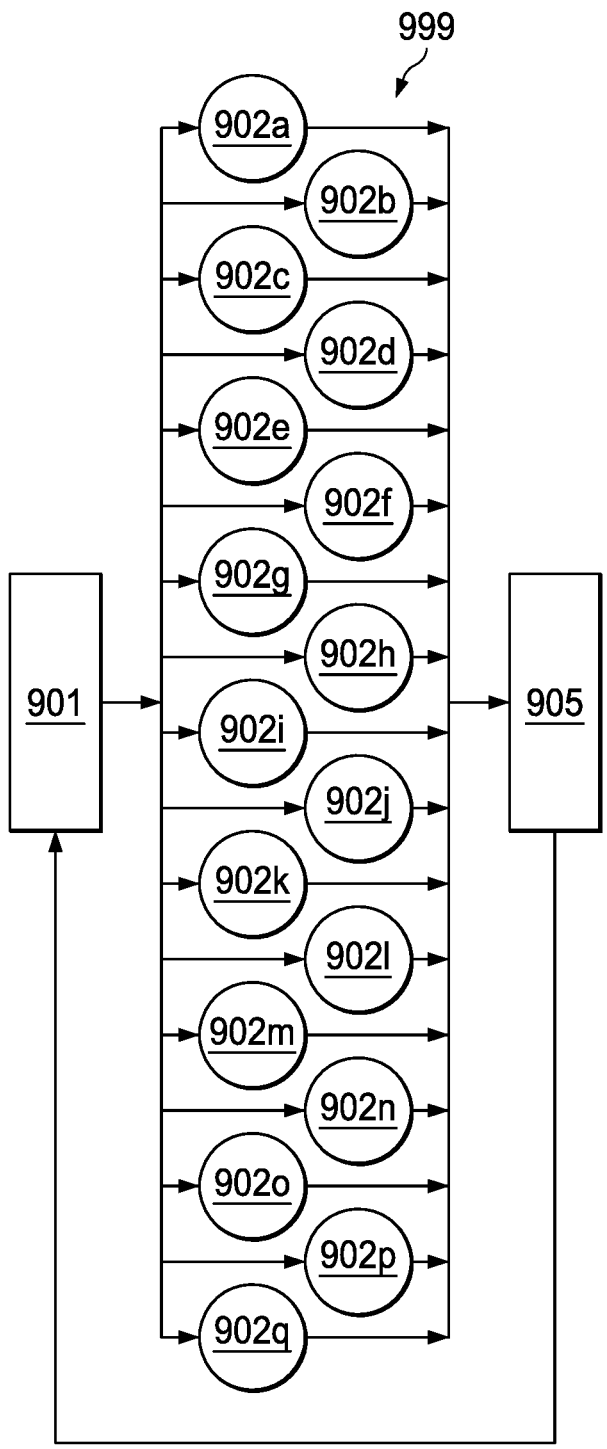
FIG. 1A is a diagram of a low grade waste heat recovery system.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a de-pentanizer condenser, an amine-di-isopropanol (ADIP) cooler, a regenerator overhead (OVHD) condenser, a Reid vapor pressure (RVP) column condenser, a de-propanizer condenser, a de-butanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG de-colorizer condenser, or combinations thereof.

Fractionation Section

Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. De-ethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL". De-propanizing and de-butanizing separate propane and butane, respectively, from C3+ NGL and C4+ NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the de-ethanizer, about 50 trays in the de-propanizer, and about 55 trays in the de-butanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the de-ethanizing module, the de-propanizing module and the de-butanizing module, each of which is described later.

De-Ethanizer Module (or De-Ethanizer Column)

The C2+ NGL is pre-heated before entering the de-ethanizer column for fractionation. The separated ethane leaves the column as overhead gas. The ethane gas is condensed by a closed-loop propane refrigeration system.

After being cooled and condensed, the ethane is a mixture of gas and liquid. The liquid ethane is separated and pumped back to the top of the column as reflux. The ethane gas is warmed in an economizer and then sent to users. The bottoms product from the de-ethanizer reboiler is C3+ NGL, which is sent to the de-propanizer module.

De-Propanizer Module (or De-Propanizer Column)

From the de-ethanizer module, C3+ NGL enters the de-propanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the de-butanizer module De-Butanizer Module (or De-Butanizer Column)

C4+ enters the de-butanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two de-hydrators containing molecular sieve desiccant beds. One de-hydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the de-hydrator, dry C3/C4 products flow to refrigeration.

Natural Gasoline (NG) Processing Section

NG processing includes RVP control, de-colorizing and de-pentanizing sections.

RVP Control Section

A Reid vapor pressure (RVP) control section (or rerun unit) is a fractionator column that receives the C5+NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

De-Colorizing Section

The de-colorizing section removes color bodies from NG. Color bodies are traces of heavy ends found in the de-butanizer bottoms product. Other impurities such as corrosion products from the pipeline may also be present. These must be removed for NG to meet the color specification. De-colorizer feed can be RVP column bottoms product or de-butanizer bottoms product, or a combination of both. Additional natural gasoline can also be supplied from other facilities to maintain a hexane plus (C6+) product supply. If de-colorizing is needed, NG first passes through a pre-flash-drum. A large portion of the lighter NG components vaporizes and leaves the drum as overhead. The heavier NG components remain along with the color bodies and are fed to the de-colorizer column, where the remaining color bodies are separated. The NG leaves the de-colorizer as overhead gas and is condensed and collected in the NG product drum, with some pumped back to the column as reflux. Overhead from the column and flash drum are joined and pumped to either the de-pentanizer (described later) or cooled and sent to storage in the feed product surge unit. The color bodies leave the de-colorizer as bottoms product and are pumped to the feed and surge unit to be injected into a crude line.

De-Pentanizing Section

De-pentanizing uses a fractionation column to produce a pentane overhead product and a C6+ bottoms product. Both the pentane product and the C6+ bottoms product are separately fed to storage or downstream the petrochemical plants. The feed to the de-pentanizer is the NG product stream from the de-colorizing section. Feed can be increased or decreased based on the demand for C6+ bottoms product. If the NGL fractionation plant NG production cannot meet demand, NG can be imported from oil refineries. The de-colorized NG is preheated before entering the de-pentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the de-pentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
|---|---|
| Propane refrigerant condenser | 94 |
| Propane de-hydration condenser | 22 |
| Butane de-hydrator condenser | 9 |
| Naphtha cooler | 11 |
| De-pentanizer condenser | 100 |
| ADIP cooler | 73 |
| Regenerator OVHD condenser | 18 |
| NG flash vapor condenser | 107 |
| NG de-colorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| De-propanizer condenser | 194 |
| De-butanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m³/day (for example, 120,000 m³/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and such instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

Waste heat from a natural gas liquid fractionation plant can be recovered from a network of one or more heat exchangers located in the natural gas liquid fractionation plant. The waste heat recovered by the heat exchangers can be used to power a modified Goswami cycle based waste heat to power and cooling conversion plant. A modified Goswami cycle is an energy conversion system that uses a mixture of ammonia and water in a closed loop arrangement. In some examples, the modified Goswami cycle based plant can produce at least about 20 MW of power, such as between about 20 MW and about 30 MW of power, such as about 20 MW, about 25 MW, or about 30 MW. The plant can also produce a process cooling or chilling capacity of at least 300 MM Btu/h, such as between about 300 MM Btu/h and about 500 MM Btu/h, such as about 300 MM Btu/h, about 400 MM Btu/h, or about 500 MM Btu/h.

FIG. 1A is a schematic diagram of an example of a low grade waste heat recovery system. The schematic includes a storage tank 901 to store buffer fluid, for example, oil, pressurized water, or such buffer fluid. The buffer fluid from the storage tank 901 is flowed to a heat exchanger network 999 which, in some implementations, can include 17 heat exchangers (for example, heat exchangers 902a, 902b, 902c, 902d, 902e, 902f, 902g, 902h, 902i, 902j, 902k, 902l, 902m, 902n, 902o, 902p, 902q), which are described in detail later. The buffer fluid is flowed through the heat exchanger network 999 and heated by streams in the NGL fractionation plant (described later). As described later, the heated buffer fluid from the storage tank 901 is used to generate power and sub-ambient cooling capacity in a modified Goswami cycle system 905. The buffer fluid is then returned to the storage tank 901.

Figure 1B:
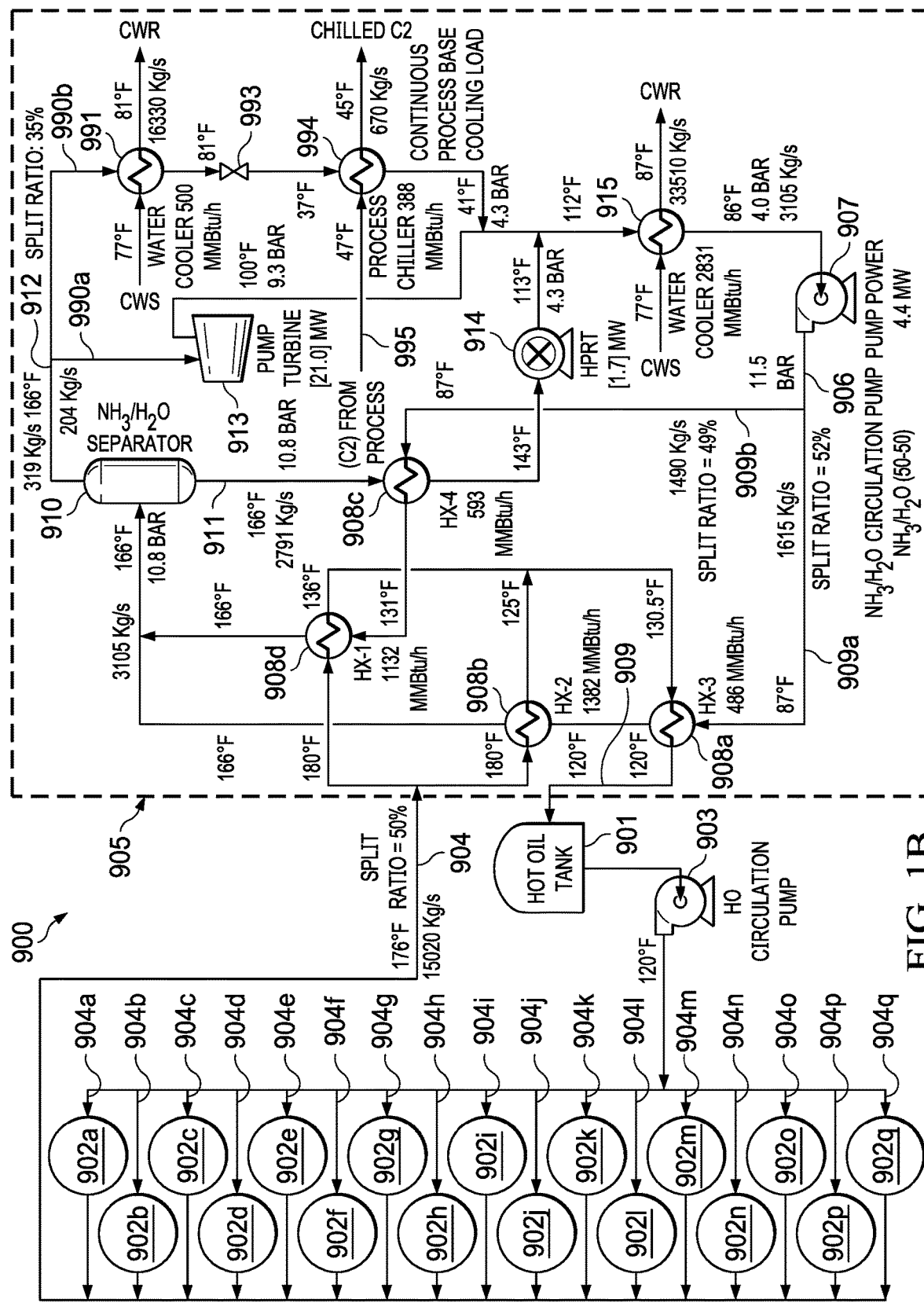
FIG. 1B is a diagram of a modified Goswami cycle based waste heat to power and cooling conversion plant.

Referring to FIG. 1B, a modified Goswami cycle based plant 900 includes an storage tank 901 that stores buffer fluid 904, such as oil, water, an organic fluid, or another buffer fluid. The buffer fluid 904 is pumped from the storage tank 901 to heat exchangers 902a-902q by a buffer fluid circulation pump 903. For instance, the buffer fluid 904 in the storage tank 901 can be at a temperature of between about 110° F. and about 130° F., such as about 110° F., about 120° F., or about 130° F.

Individual streams of buffer fluid 904a-904q are heated in each of the heat exchangers 902a-902q by recovery of waste heat from process streams in the natural gas liquid fractionation plant. The heat exchangers 9024a-902q can be configured such that they are parallel to one another in relation to the flow of the buffer fluid 904a-904q. The heated streams of buffer fluid 904a-904q are joined into a single header of hot buffer fluid 904 downstream of the heat exchangers 902a-902q. The hot buffer fluid 904 can be at a temperature of, for example, between about 170° F. and about 190° F., such as about 170° F., about 180° F., or about 190° F. The hot buffer fluid 904 can flow at a rate of between about 14,000 kg/s and about 16,000 kg/s, such as about 14,000 kg/s, about 15,000 kg/s, or about 16,000 kg/s.

The heat from the hot buffer fluid 904 is used to heat a working fluid 906, such as an ammonia-water mixture, in a modified Goswami cycle 905. A Goswami cycle is able to utilize low heat source temperatures, for example, less than about 200° C., to drive power generation. A Goswami cycle combines a Rankine cycle and an absorption refrigeration cycle to provide combined cooling and power generation. High purity ammonia vapor is used in a turbine of the Goswami cycle. The high concentration ammonia can be expanded such that a reduced temperature without condensation is achieved. This reduced temperature ammonia-rich buffer fluid can then be used to provide refrigeration output. In the modified Goswami cycle 905, high quantity cooling is enabled by providing both power generation and cooling functionality using the waste heat recovered from the natural gas liquid fractionation plant.

In some examples, the modified Goswami cycle based plant 900 can produce at least about 20 MW of power, such as between about 20 MW and about 30 MW of power, such as about 20 MW, about 25 MW, or about 30 MW. The plant 900 can also produce a process cooling or chilling capacity of at least 300 MM Btu/h, such as between about 300 MM Btu/h and about 500 MM Btu/h, such as about 300 MM Btu/h, about 400 MM Btu/h, or about 500 MM Btu/h. This cooling capacity enables power that would have been used for mechanical refrigeration to be conserved, such as at least about 40 MW of power, such as about 40 MW, about 45 MW, or about 50 MW of power.

The modified Goswami cycle 905 includes a pump 907. The pump 907 can consume, for instance, between about 4 MW and about 5 MW of power, such as about 4 MW, about 4.5 MW, or about 5 MW. The pump 907 can pump the working fluid 906 from a starting pressure of, for instance, between about 3.5 Bar and about 4.5 Bar, such as about 3.5 Bar, about 4 Bar, or about 4.5 Bar; to a higher pressure of, for instance, between about 11 Bar and about 12 Bar, such as about 11 Bar, about 11.5 Bar, or about 12 Bar. The pump 907 can be sized to receive the working fluid 906 at a flow rate of between about 2500 kg/s and about 3500 kg/s, such as about 2500 kg/s, about 3000 kg/s, or about 3500 kg/s.

The working fluid 906 can be a mixture of ammonia and water, for instance, between about 45% and about 55% ammonia, such as about 45%, about 50% ammonia, or about 55%; and between about 45% and about 55% water, such as about 45%, about 50%, or about 55%. The working fluid 906 is pumped by the pump 907 into a network of heat exchangers 908a, 908b, 908d that together achieve partial evaporation of the working fluid 906 using heat from the buffer fluid 904, directly or indirectly. The heat exchangers are divided into two branches: a first branch including the heat exchangers 908a and 908b, and the second branch including a heat exchanger 908c and the heat exchanger 908d. The working fluid 906 flowing along the two branches is heated and partially vaporized using between about 2500 MM Btu/h and about 3500 MM Btu/h, such as about 2500 MM Btu/h, about 3000 MM Btu/h, or about 3500 MM Btu/h, of waste heat collected by the buffer fluid; and using between about 200 MM Btu/h and about 900 MM Btu/h, such as about 200 MM Btu/h, about 300 MM Btu/h, or about 900 MM Btu/h, of heat from a bottoms stream of a modified Goswami cycle separator (the liquid vapor separator 910, such as an ammonia-water separator).

The first branch of the heat exchangers 908a, 908b is in a parallel configuration with the second branch of the heat exchangers 908c, 908d in relation to the flow of the working fluid 906. Within each branch, the two heat exchangers are arranged in series in relation to the flow of working fluid 906, such that the heat exchanger 908a is in series with the heat exchanger 908b and the heat exchanger 908c is in series with the heat exchanger 908d. With respect to the flow of the buffer fluid 904, the heat exchanger 908b is in a parallel configuration with the heat exchanger 908d, and the parallel heat exchangers 908b and 908d are in series with the heat exchanger 908a.

The heat exchanger 908a can have a thermal duty of, for instance, between about 400 MM Btu/h and about 500 MM Btu/h, such as about 400 MM Btu/h, about 425 MM Btu/h, about 450 MM Btu/h, about 475 MM Btu/h, or about 500 MM Btu/h. The heat exchanger 908b can have a thermal duty of, for instance, between about 1000 MM Btu/h and about 1500 MM Btu/h, such as about 1000 MM Btu/h, about 1100 MM Btu/h, about 1200 MM Btu/h, about 1300 MM Btu/h, about 1400 MM Btu/h, or about 1500 MM Btu/h. The heat exchanger 908c can have a thermal duty of, for instance, between about 550 MM Btu/h and about 650 MM Btu/h, such as about 550 MM Btu/h, about 575 MM Btu/h, about 600 MM Btu/h, about 625 MM Btu/h, or about 650 MM Btu/h. The heat exchanger 908d can have a thermal duty of, for instance, between about 1100 MM Btu/h and about 1200 MM Btu/h, such as about 1100 MM Btu/h, about 1125 MM Btu/h, about 1150 MM Btu/h, about 1175 MM Btu/h, or about 1200 MM Btu/h. The buffer fluid 904 flowing through the network of heat exchangers 908a, 908b, 908d cools and returns to the storage tank 901.

The working fluid 906 exiting the pump 907 can have a temperature of, for instance, between about 80° F. and about 100° F., such as about 80° F., about 90° F., or about 100° F. The working fluid 906 from the pump 907 is split into two portions, for instance, with a split ratio of about between about 48% and about 52%, such as about 48%, about 50%, or about 52%. A first portion 909a of the working fluid 906 from the pump 907 is pre-heated and partially vaporized by exchange with the buffer fluid 904 in the heat exchangers 908a, 908b, which are in series in relation to the working fluid flow. For instance, the first portion 909a of the working fluid 906 is heated to a temperature of between about 160° F. and about 180° F., such as about 160° F., about 170° F., or about 180° F.

A second portion 909b of the working fluid 906 from the pump 907 is pre-heated and partially vaporized by exchange with a liquid stream 911 (from a liquid-vapor separator 910, described in the following paragraphs) in the heat exchanger 908c. For instance, the second portion 909b is heated to a temperature of between about 120° F. and about 140° F., such as about 120° F., about 130° F., or about 140° F. The heated second portion 909b is further heated and partially vaporized by exchange with the buffer fluid 904 in the heat exchanger 908d, which is in series in relation to the working fluid flow with the heat exchanger 908c. For instance, the second portion 909b is heated to a temperature of between about 160° F. and about 180° F., such as about 160° F., about 170° F., or about 180° F.

The first and second portions 909a, 909b of the working fluid, which are heated and partially vaporized, flow into the liquid-vapor separator 910 that separates liquid from vapor, such as liquid ammonia and water from ammonia-water vapor. The pressure of the working fluid upon entry into the liquid-vapor separator 910 can be, for instance, between about 10 Bar and about 11 Bar, such as about 10 Bar, about 10.5 Bar, or about 11 Bar. A liquid stream 911 of the working fluid, such as liquid ammonia and water, which is a lean stream, exits the bottom of the separator 910 and a vapor stream 912 of the working fluid, such as ammonia-water vapor, exits the top of the separator 910.

The liquid stream 911 flows via the heat exchanger 908c to a high pressure recovery turbine (HPRT) 914, for example, a hydraulic liquid turbine, for additional power generation. After exchange at the heat exchanger 908c, the temperature of the liquid stream 911 is between about 130° F. and about 150° F., such as about 130° F., about 140° F., or about 150° F. The HPRT 914 can generate at least about 1 MW of power, such as between about 1 MW and about 2 MW of power, such as about 1 MW, about 1.5 MW, or about 2 MW of power. Power is generated by the HPRT 914 using a flow rate of the liquid stream 911 of between about 2500 kg/s and about 3000 kg/s, such as about 2500 kg/s, about 2750 kg/s, or about 3000 kg/s. The HPRT 914 reduces the pressure of the liquid stream 911 to, for instance, between about 4 Bar and about 5 Bar, such as about 4 Bar, about 4.5 Bar, or about 5 Bar; and reduces the temperature of the liquid stream 911 to, for instance, between about 100° F. and about 120° F., such as about 100° F., about 110° F., or about 120° F.

The stream 912, which is a rich stream, is split into a first portion 990a and a second portion 990b. The split ratio, which is the percentage of vapor 912 split into the second portion 990b, can be, for instance, between about 30% and about 40%, such as about 30%, about 35%, or about 40%. The first portion 990a of the vapor stream flows to a turbine 913 and the second portion 990b flows to a water cooler 991, discussed in the following paragraphs.

The turbine 913 (in combination with a generator, not shown) can generate power, such as at least about 15 MW of power, such as between about 15 MW and about 30 MW of power, such as about 15 MW, about 20 MW, about 25 MW, or about 30 MW of power. Power is generated by the turbine 913 using a flow rate of vapor of between about 300 kg/s and about 400 kg/s, such as about 300 kg/s, about 350 kg/s, or about 400 kg/s. The turbine 913 reduces the pressure of the vapor 990a to, for instance, between about 9 Bar and about 10 Bar, such as about 9 Bar, about 9.5 Bar, or about 10 Bar; and reduces the temperature of the vapor 990a to, for instance, between about 90° F. and about 110° F., such as about 90° F., about 100° F., or about 110° F.

The second portion 990b (sometimes referred to as a rich ammonia stream 990b) of the stream 912 is cooled in a cooler 991, such as a cooling water condenser or an air cooler. The cooler 991 can have a thermal duty of, for example, between about 450 MM Btu/h and about 550 MM Btu/h, such as about 450 MM Btu/h, about 500 MM Btu/h, about 550 MM Btu/h, or another thermal duty. The cooler 991 cools the rich ammonia stream 990b to a temperature of, for example, between about 75° F. and about 85° F., such as about 75° F., about 80° F., or about 85° F. The cooled rich ammonia stream 990b passes through a letdown valve 993 which further cools the rich ammonia stream 990b by throttling the pressure. For example, the letdown valve 993 can cool the rich ammonia stream 990b to a temperature of between about 30° F. and about 40° F., such as about 30° F., about 35° F., or about 40° F.

Cooling water 992 flowing into cooler 991 can have a temperature of between about 70 and about 80° F., such as about 70° F., about 75° F., about 80° F., or another temperature. Cooling water 992 can be heated by exchange at cooler 991 to a temperature of, for example, between about 75° F. and about 85° F., such as about 75° F., about 80° F., or about 85° F. The flow rate of cooling water 992 flowing through the cooler 991 can be between, for instance, about 15000 kg/s and about 17000 kg/s, such as about 15000 kg/s, about 16000 kg/s, or about 17000 kg/s. The cooler 991 can have a thermal duty of between about 400 MM Btu/h and about 600 MM Btu/h, such as about 400 MM Btu/h, about 500 MM Btu/h, or about 600 MM Btu/h.

Figure 1C:
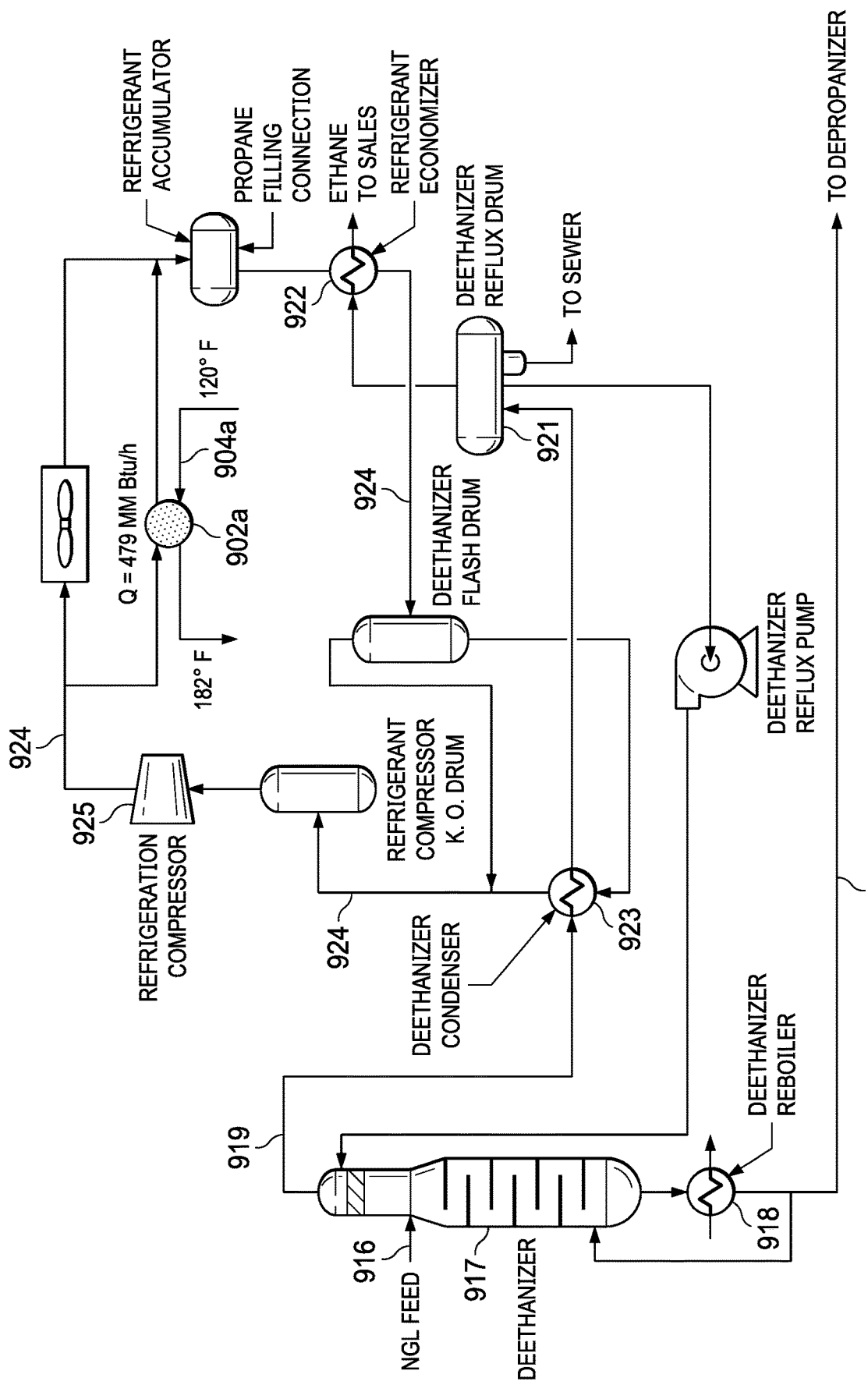
FIG. 1C is a diagram of a deethanizer section of a NGL fractionation plant.

The cooled rich ammonia stream 990b is used in a process chiller 994 to cool a stream of ethane 995 from a deethanizer section of the natural gas liquid fractionation plant. For instance, the ethane 995 can be a top stream 918 of ethane gas from a deethanizer 917 (FIG. 1C). The process chiller 994 can have a thermal duty of, for example, between about 350 MM Btu/h and about 450 MM Btu/h, such as about 350 MM Btu/h, about 400 MM Btu/h, or about 450 MM Btu/h. The process chiller 994 chills the ethane 995 while heating the rich ammonia stream 990b. For instance, the ethane 995 is cooled from a temperature of between about 45° F. and about 55° F., such as about 45° F., about 50° F., or about 55° F.; to a temperature of between about 40° F. and about 50° F., such as about 40° F., about 45° F., or about 50° F. The rich ammonia stream 990b can be heated to a temperature of between about 35° F. and about 45° F., such as about 35° F., about 40° F., or about 45° F. The ethane 995 can flow through the process chiller 994 at a flow rate of between about 600 kg/s and about 800 kg/s, such as about 600 kg/s, about 700 kg/s, or about 800 kg/s.

The stream 990a output from the turbine 913, the stream 911 output from the HPRT, and the stream 990b combine into a single stream of the working fluid 906. The working fluid 906 is cooled in a cooler 915, such as a cooling water condenser or an air cooler, by exchange with cooling water. The cooler 915 can have a thermal duty of, for example, between about 2500 MM Btu/h and about 3500 MM Btu/h, such as about 2500 MM Btu/h, about 3000 MM Btu/h, or about 3500 MM Btu/h. The cooler 915 cools the working fluid 906 to a temperature of, for example, between about 80° F. and about 100° F., such as about 80° F., about 90° F., or about 100° F. The cooling water used to cool the working fluid 906 can have a temperature of between about 70° F. and about 90° F., such as about 70° F., about 80° F., or about 90° F.; and can be heated to a temperature of between about 80° F. and about 100° F., such as about 80° F., about 90° F., or about 100° F. In some examples, the temperature of the cooling water can vary depending on the season. For instance, the cooling water can have a lower temperature in winter than in summer. The volume of cooling water flowing through the cooler 915 can be between about 33,000 kg/s and about 35,000 kg/s, such as about 33,000 kg/s, about 34,000 kg/s, or about 35,000 kg/s.

The heat exchangers 902a-902q can be incorporated into various sections of a natural gas liquid fractionation plant to recover waste heat from liquid or vapor streams in those sections.

Figure 1D:
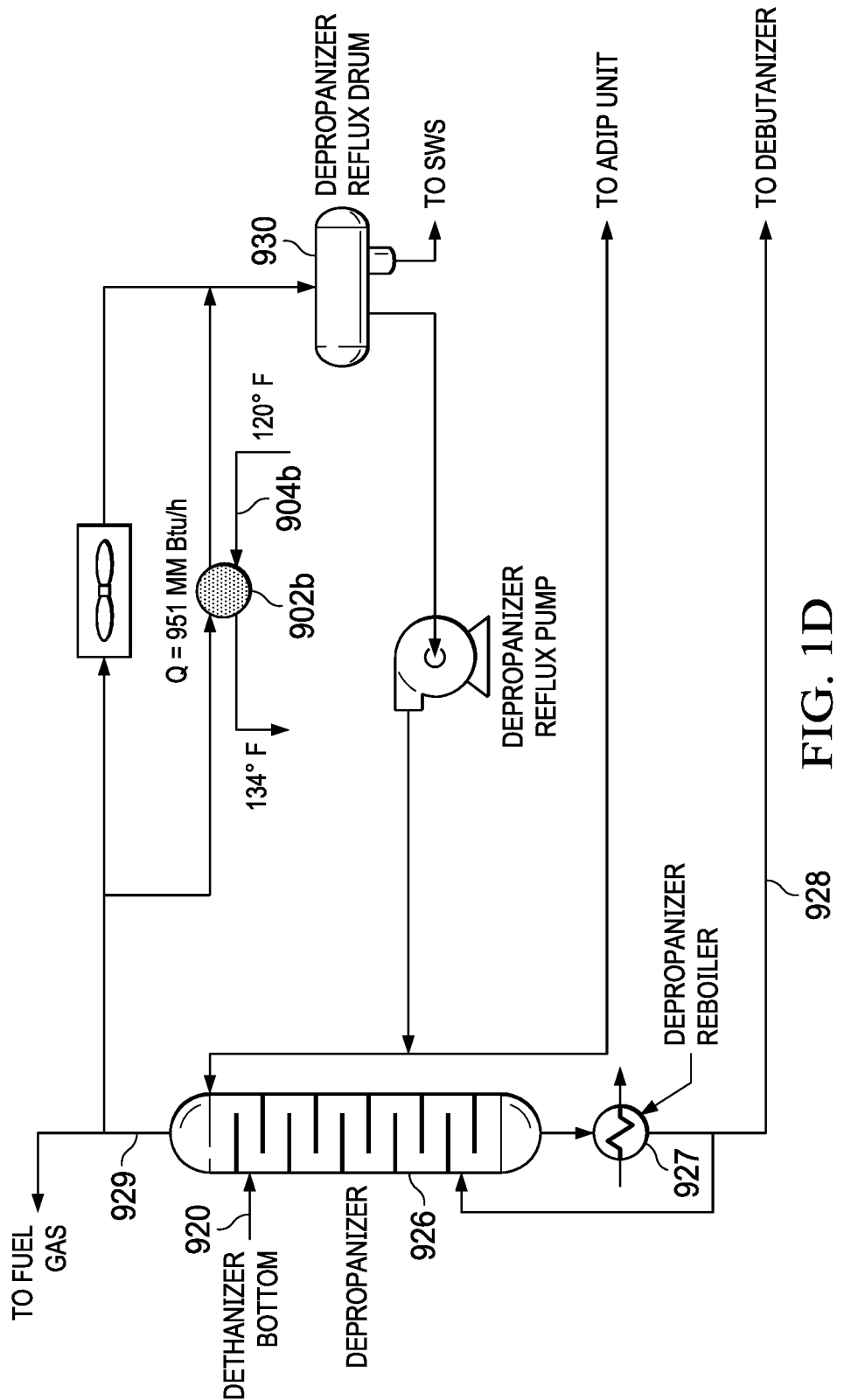
FIG. 1D is a diagram of a depropanizer section of a NGL fractionation plant.

Referring to FIG. 1C, in a deethanizer section of the natural gas liquid fractionation plant, a feed stream 916 of natural gas liquid is received into a deethanizer 917. A bottoms stream from the deethanizer 917 is processed in a reboiler 918. Vaporized ethane from the reboiler 918 is returned to the deethanizer 917 and C3+ NGL bottoms 920 from the deethanizer 917 are provided to a depropanizer 926 (FIG. 1D).

A top stream 919 of ethane gas from the deethanizer 917 is condensed in a condenser 923 and provided to a reflux drum 921. A top stream of ethane gas from the reflux drum 921 is warmed in a refrigerant economizer 922 and output, for instance, for sales. A bottoms stream of liquid ethane from the reflux drum 921 is returned to the deethanizer 917.

The condensation of ethane gas in the condenser 923 and the warming of ethane gas in the refrigerant economizer 922 is achieved by exchange with a refrigerant 924, such as propane, in a closed-loop refrigeration system. The refrigerant 924 warms as it absorbs heat from the ethane gas in the condenser 923. The warmed refrigerant 924 is then compressed in a refrigeration compressor 925. The compressed refrigerant 924 output from the refrigeration compressor 925 is cooled in the heat exchanger 902a by exchange with the stream 904a of buffer fluid. The presence of the heat exchanger 902a recovers waste heat from the refrigerant 924, and enables other components (for instance, cooling units or condensers) that would have been used to cool the refrigerant 924 to be bypassed or eliminated from the deethanizer section.

In some examples, the refrigerant 924 can be cooled. The stream 904a of buffer fluid can be heated to a temperature of between about 180° F. and about 200° F., such as about 180° F., about 182° F., about 190° F., or about 200° F. The thermal duty of the heat exchanger 902a can be between about 400 MM Btu/h and about 500 MM Btu/h, such as about 400 MM Btu/h, about 425 MM Btu/h, about 450 MM Btu/h, about 475 MM Btu/h, or about 500 MM Btu/h.

Referring to FIG. 1D, in a depropanizer section of the natural gas liquid fractionation plant, the C3+ NGL bottoms stream 920 from the deethanizer 917 (FIG. 1C) are received into a depropanizer 926. A bottoms stream from the depropanizer 926 is processed in a reboiler 927. Vaporized propane from the reboiler is returned to the depropanizer 926 and a C4+ NGL bottoms product 928 from the depropanizer 926 are provided to a debutanizer 935 (FIG. 1F).

Propane gas 929 exits from the top of the depropanizer 926 and is cooled in the heat exchanger 902b by exchange with the stream 904b of buffer fluid. The cooled propane gas 929 is collected in a reflux drum 930. A portion of the liquid propane from the reflux drum 930 is returned to the depropanizer 926, and a portion of the liquid propane from the reflux drum 930 is either treated (for instance, in an ADIP unit) or sent to users as untreated product. The presence of the heat exchanger 920b recovers waste heat from the propane gas 929, enabling other components (for instance, cooling units or condensers) that would have been used to cool the propane gas 929 to be bypassed or eliminated from the depropanizer section.

In some examples, the propane gas 929 can be cooled. The stream 904b of buffer fluid can be heated to a temperature of between about 120° F. and about 140° F., such as about 120° F., about 130° F., about 134° F., or about 140° F. The thermal duty of the heat exchanger 902b can be between about 900 MM Btu/h and about 1000 MM Btu/h, such as about 900 MM Btu/h, about 925 MM Btu/h, about 950 MM Btu/h, about 975 MM Btu/h, or about 1000 MM Btu/h.

Figure 1E:
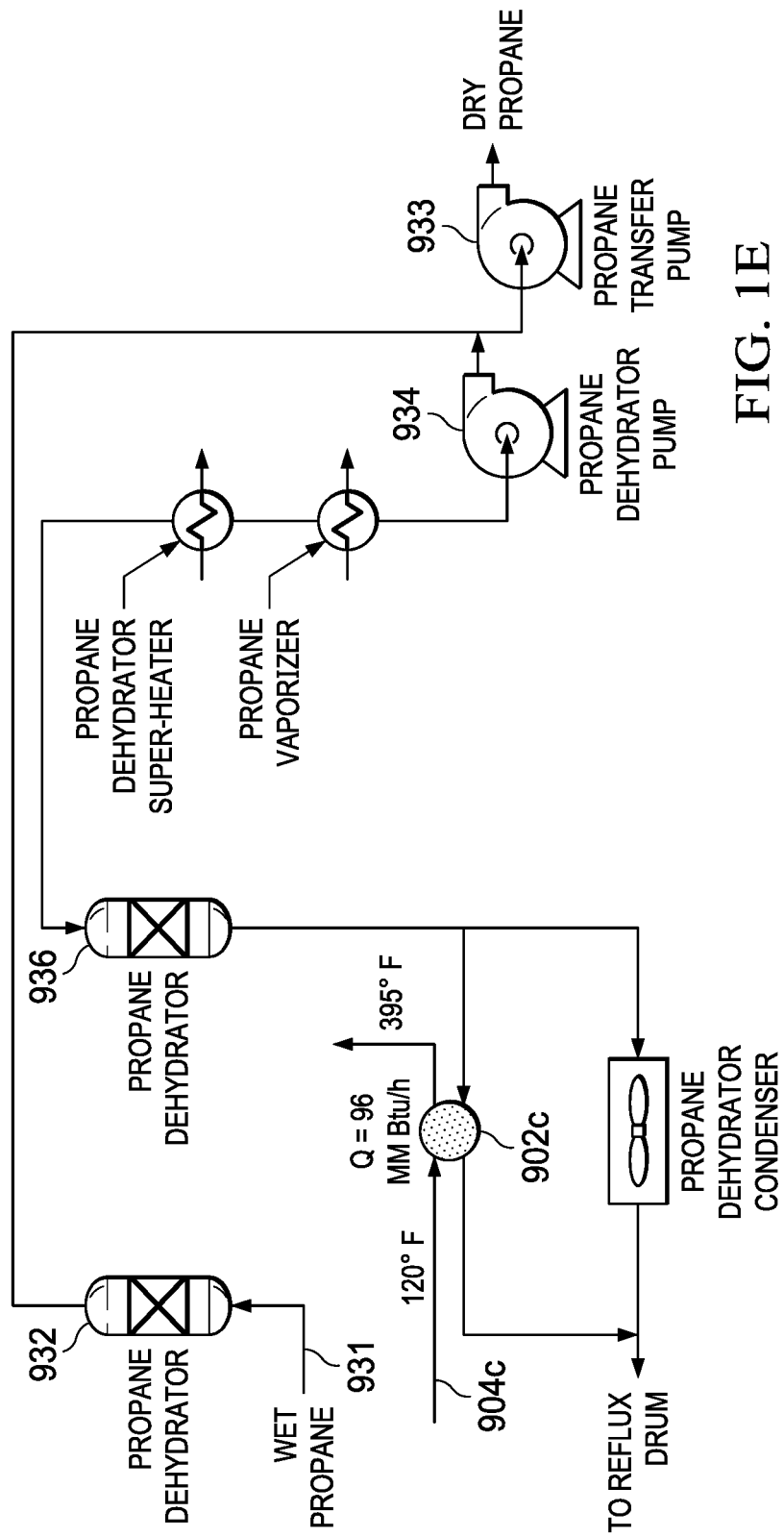
FIG. 1E is a diagram of a propane dehydrator section of a NGL fractionation plant.
Figure 1F:
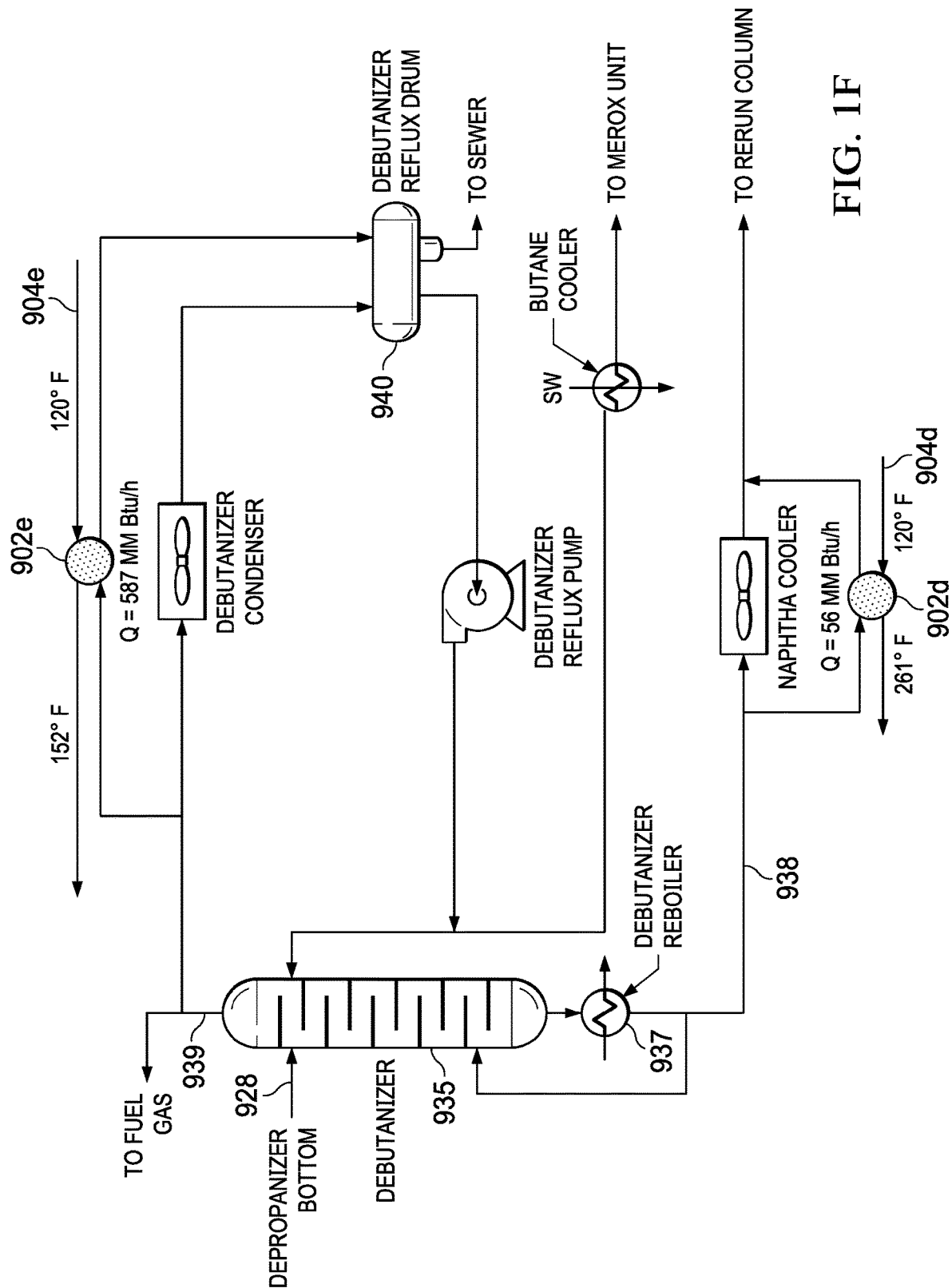
FIG. 1F is a diagram of a debutanizer section of a NGL fractionation plant.

Referring to FIG. 1E, in a propane dehydrator section of the natural gas liquid fractionation plant, wet propane 931 is dehydrated in a propane dehydrator 932. The wet propane 931 can be, for instance, the propane gas 929 in the depropanizer section (FIG. 1D). A portion 933 of the dry propane from the propane dehydrator 932 is output as dry propane, for instance, to a propane refrigeration section (FIG. 1L). Another portion 934 of the propane from the propane dehydrator 932 is further dehydrated in a propane dehydrator 936. The dry propane 934 output from the propane dehydrator 936 is cooled in the heat exchanger 902c by exchange with the stream 904c of buffer fluid. The cooled dry propane 934 is returned to the depropanizer reflux drum 930 (FIG. 1D). The presence of the heat exchanger 902c recovers waste heat from the dry propane 934, enabling other components (for instance, cooling units or condensers) that would have been used to cool the dry propane 934 to be bypassed or eliminated from the propane dehydrator section.

In some examples, the dry propane 934 can be cooled. The stream 904c of buffer fluid can be heated to a temperature of between about 390° F. and about 410° F., such as about 390° F., about 395° F., about 400° F., or about 410° F. The thermal duty of the heat exchanger 902c can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Referring to FIG. 1F, in a debutanizer section of the natural gas liquid fractionation plant, the C4+ NGL bottoms product 928 from the depropanizer 926 (FIG. 1D) are received into a debutanizer 935. A bottoms stream from the debutanizer 935 is processed in a reboiler 937. Vaporized butane from the reboiler is returned to the debutanizer 935. A C5+ bottoms product 938 from the debutanizer 935 is cooled in the heat exchanger 902d by exchange with the stream 904d of buffer fluid. The cooled C5+ bottoms product 938 is provided to a rerun unit (FIG. 1P). The presence of the heat exchanger 902d recovers waste heat from the C5+ bottoms product 938, enabling other components (for instance, a naphtha cooling unit) that would have been used to cool the C5+ bottoms product 938 to be bypassed or eliminated from the debutanizer section.

In some examples, the C5+ bottoms product 938 can be cooled. The stream 902d of buffer fluid can be heated to a temperature of between about 250° F. and about 270° F., such as about 250° F., about 260° F., about 261° F. or about 270° F. The thermal duty of the heat exchanger 902d can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Butane gas 939 exits from the top of the debutanizer 935 and is cooled in the heat exchanger 902e by exchange with the stream 904e of buffer fluid. The cooled butane gas 939 is collected in a reflux drum 940. A portion of the liquid butane from the reflux drum is returned to the debutanizer 935, and a portion of the liquid butane from the reflux drum 940 is either treated (for instance, in a MEROX unit) or sent to users as untreated product. The presence of the heat exchanger 902e recovers waste heat from the butane gas 939, enabling other components (for instance, cooling units or condensers) that would have been used to cool the butane gas 939 to be bypassed or eliminated from the debutanizer section.

In some examples, the butane gas 939 can be cooled. The stream 904e of buffer fluid can be heated to a temperature of between about 140° F. and about 160° F., such as about 140° F., about 150° F., about 152° F. or about 160° F. The thermal duty of the heat exchanger 902e can be between about 550 MM Btu/h and about 650 MM Btu/h, such as about 550 MM Btu/h, about 575 MM Btu/h, about 600 MM Btu/h, about 625 MM Btu/h, or about 650 MM Btu/h.

Figure 1G:
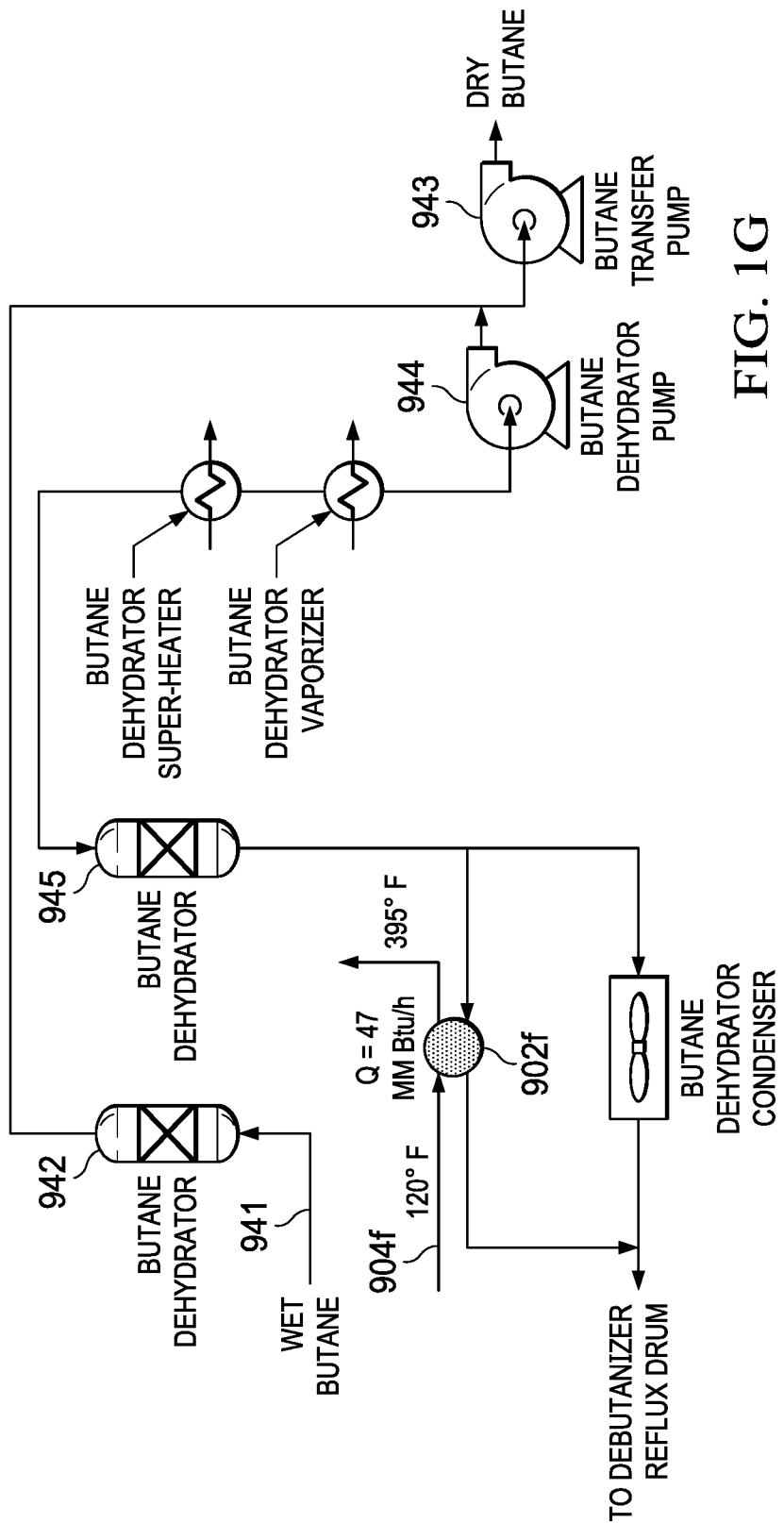
FIG. 1G is a diagram of a butane dehydrator section of a NGL fractionation plant.

Referring to FIG. 1G, in a butane dehydrator section, wet butane 941 is dehydrated in a dehydrator 942. The wet butane 941 can include, for instance, the butane gas 939 in the debutanizer section (FIG. 1F). A portion 943 of the dry butane from the dehydrator 942 is output as dry butane, for instance, to a butane refrigeration section (FIG. 1N). Another portion 944 of the butane from the dehydrator 942 is further dehydrated in a butane dehydrator 945. The dry butane 944 output from the butane dehydrator 942 is cooled in the heat exchanger 902f by exchange with the stream 904f of buffer fluid. The cooled dry butane 944 is returned to the debutanizer reflux drum 940 (FIG. 1F). The presence of the heat exchanger 902f recovers waste heat from the dry butane 944, enabling other components (for instance, cooling units or condensers) that would have been used to cool the dry butane 944 to be bypassed or eliminated from the butane dehydrator section.

In some examples, the dry butane 944 can be cooled. The stream 904f of buffer fluid can be heated to a temperature of between about 390° F. and about 410° F., such as about 390° F., about 395° F., about 400° F., or about 410° F. The thermal duty of the heat exchanger 902f can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1H:
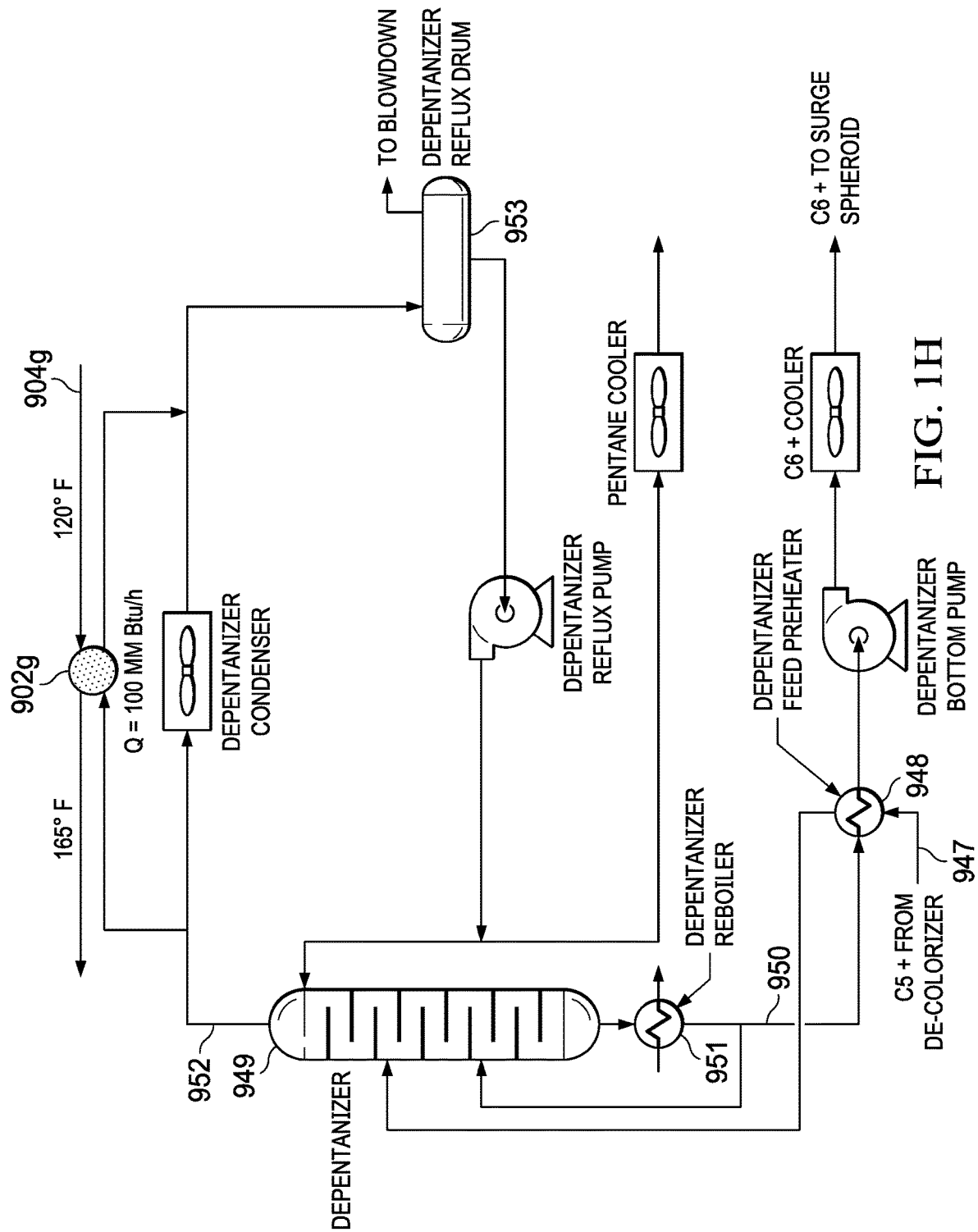
FIG. 1H is a diagram of a depentanizer section of a NGL fractionation plant.

Referring to FIG. 1H, in a depentanizer section of the natural gas liquid fractionation plant, a stream of C5+ NGL 947 received from a decolorizing section (FIG. 1J) is preheated in a heat exchanger 948 and provided into a depentanizer 949. A bottoms stream from the depentanizer 949 is processed in a reboiler 951. Vaporized pentane from the reboiler is returned to the depentanizer 949 and C6+ NGL bottoms 950 from the depentanizer 949 are used to heat the stream of C5+ NGL 947 in the heat exchanger 948 and then output to storage, such as to a surge spheroid.

A top stream 952 of pentane gas from the depentanizer 949 is cooled in the heat exchanger 902g by exchange with the stream 904g of buffer fluid. The cooled pentane 952 is collected in a reflux drum 953. A portion of the liquid pentane from the reflux drum 953 is returned to the depentanizer 949, and a portion of the liquid pentane from the reflux drum 953 is sent to storage, for instance, in a petrochemical plant. The presence of the heat exchanger 902g recovers waste heat from the pentane gas 952, and enables other components (for instance, cooling units or condensers) that would have been used to cool the pentane gas 952 to be bypassed or eliminated from the depentanizer section.

In some examples, the pentane gas 952 can be cooled. The stream 904g of buffer fluid can be heated to a temperature of between about 160° F. and about 180° F., such as about 160° F., about 165° F., about 170° F., or about 180° F. The thermal duty of the heat exchanger 904g can be between about 50 MM Btu/h and about 150 MM Btu/h, such as about 50 MM Btu/h, about 75 MM Btu/h, about 100 MM Btu/h, or about 125 MM Btu/h, or about 150 MM Btu/h.

Figure 1I:
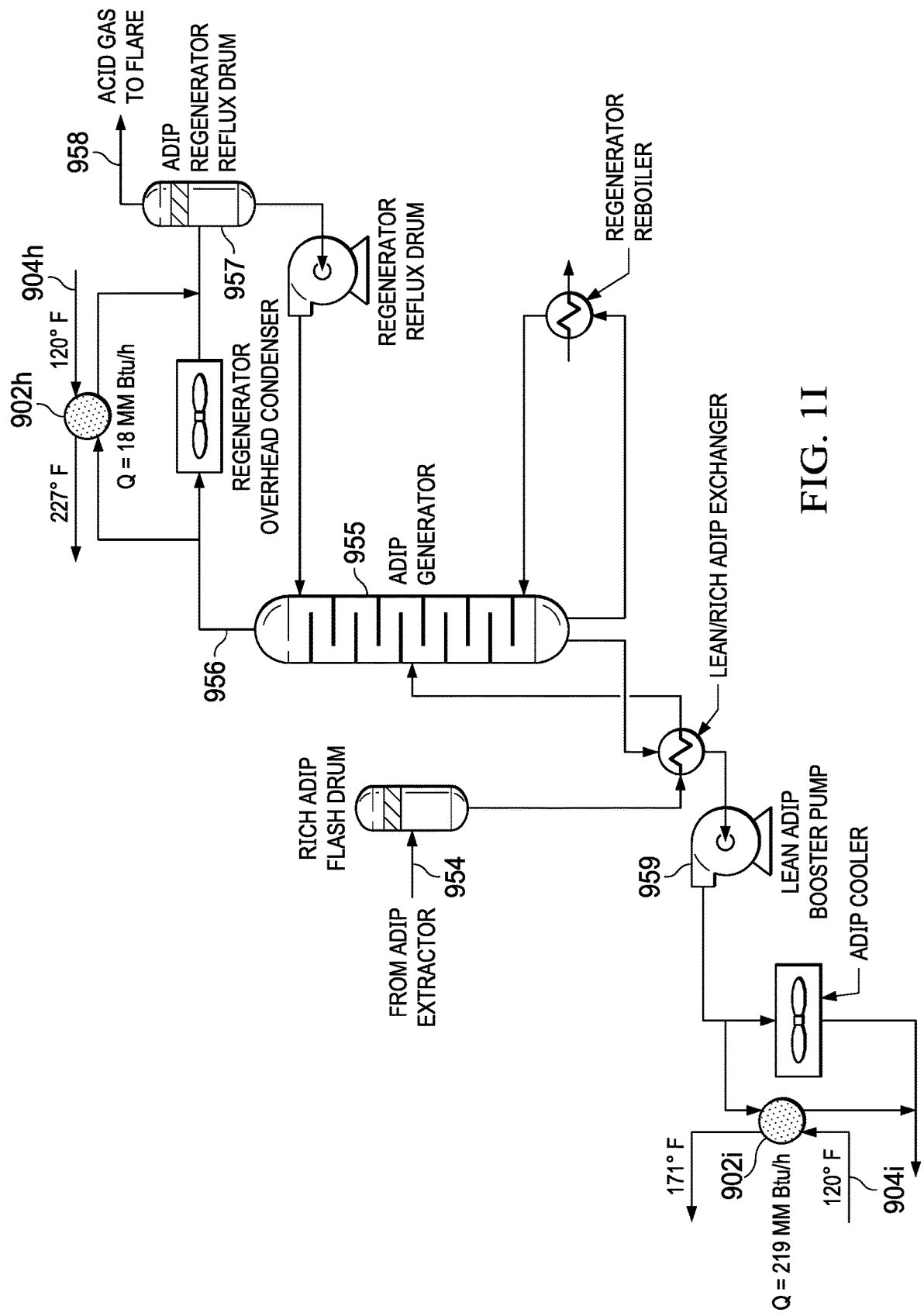
FIG. 1I is a diagram of a solvent regeneration section of a NGL fractionation plant.

Referring to FIG. 1I, in a solvent regeneration section, rich ADIP 954 from an ADIP extractor (not shown) is fed into an ADIP generator 955 to be regenerated into lean ADIP for reuse. Acid gases 956 leave the top of the ADIP generator 955 and are cooled in the heat exchanger 902h by exchange with the stream 904h of buffer fluid. The cooled acid gases 956 are refluxed in a reflux drum 957. Acid gas 958 from the reflux drum 957 is sent to flare and any remaining ADIP is returned to the ADIP generator 955. The presence of the heat exchanger 902h recovers waste heat from the acid gases 956, enabling other components (for instance, cooling units or condensers) that would have been used to cool the acid gases 956 to be bypassed or eliminated from the solvent regeneration section.

In some examples, the acid gases 956 can be cooled. The stream 904h of buffer fluid can be heated to a temperature of between about 220° F. and about 240° F., such as about 220° F., about 227° F., about 230° F., or about 240° F. The thermal duty of the heat exchanger 902h can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Lean ADIP 959 leaves the bottom of the ADIP generator 955 and is cooled in the heat exchanger 902i by exchange with the stream 904i of buffer fluid. The cooled lean ADIP 959 is returned to the ADIP extractor. The presence of the heat exchanger 902i recovers waste heat from the lean ADIP 959, enabling other components (for instance, cooling units or condensers) that would have been used to cool the lean ADIP 959 to be bypassed or eliminated from the solvent regeneration section.

In some examples, the lean ADIP 959 can be cooled. The stream 904i of buffer fluid can be heated to a temperature of between about 160° F. and about 180° F., such as about 160° F., about 170° F., about 171° F., or about 180° F. The thermal duty of the heat exchanger 902i can be between about 150 MM Btu/h and about 250 MM Btu/h, such as about 150 MM Btu/h, about 175 MM Btu/h, about 200 MM Btu/h, about 225 MM Btu/h, or about 250 MM Btu/h.

Figure 1J:
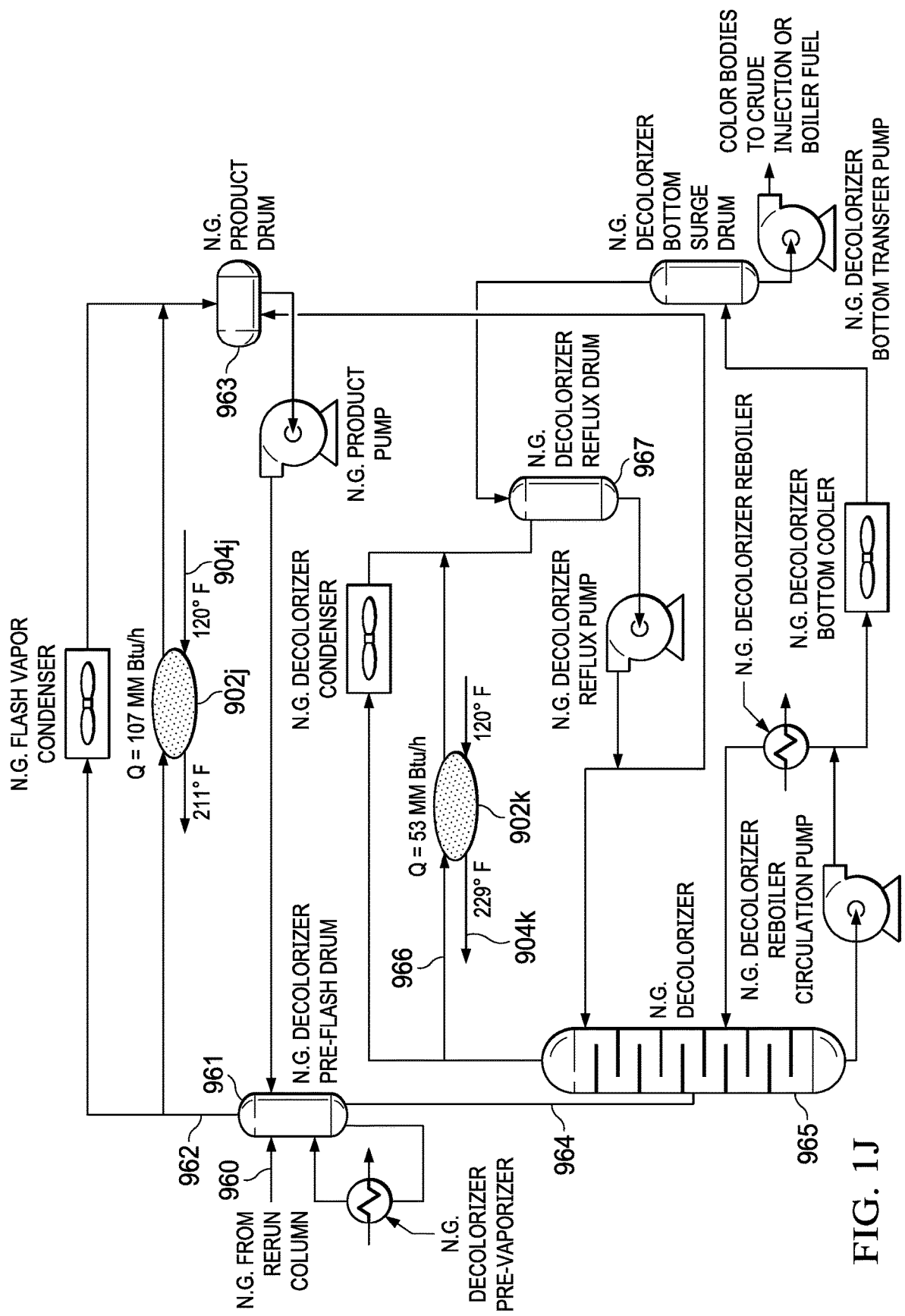
FIG. 1J is a diagram of a natural gasoline decolorizing section of a NGL fractionation plant.

Referring to FIG. 1J, in a decolorizing section of the natural gas liquid fractionation plant, NG 960 from the rerun unit is processed in a pre-flash drum 961. Light NG components 962 exit from the pre-flash drum 961 as overhead and are cooled in the heat exchanger 902j by exchange with the stream 904j of buffer fluid. The cooled light NG components 962 are stored in a product drum 963. The presence of the heat exchanger 902j recovers waste heat from the light NG components 962, enabling other components (for instance, cooling units or condensers) that would have been used to cool the light NG components 962 to be bypassed or eliminated from the decolorizing section.

In some examples, the light NG components 962 can be cooled. The stream 904j of buffer fluid can be heated to a temperature of between about 200° F. and about 220° F., such as about 200° F., about 210° F., about 211° F. or about 220° F. The thermal duty of the heat exchanger 902j can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Heavy NG components and color bodies exit from the pre-flash drum 961 as a bottoms stream 964 and are fed into a decolorizer 965. Color bodies leave the bottom of the decolorizer 965 and are pumped to a feed and surge unit to be injected into a crude line. NG leaves the decolorizer 965 as overhead NG gas 966, which is cooled in the heat exchanger 902k by exchange with the stream 904k of buffer fluid. The cooled NG gas 966 is provided to a reflux drum 967. A portion of the liquid NG from the reflux drum 967 is stored in the product drum 963 and a portion is returned to the decolorizer 965. The presence of the heat exchanger 902k recovers waste heat from the NG gas 966, enabling other components (for instance, cooling units or condensers) that would have been used to cool the NG gas 966 to be bypassed or eliminated from the decolorizing section.

In some examples, the NG gas 966 can be cooled. The stream 904k of buffer fluid can be heated to a temperature of between about 220° F. and about 240° F., such as about 220° F., about 229° F., about 230° F., or about 240° F. The thermal duty of the heat exchanger 902k can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1K:
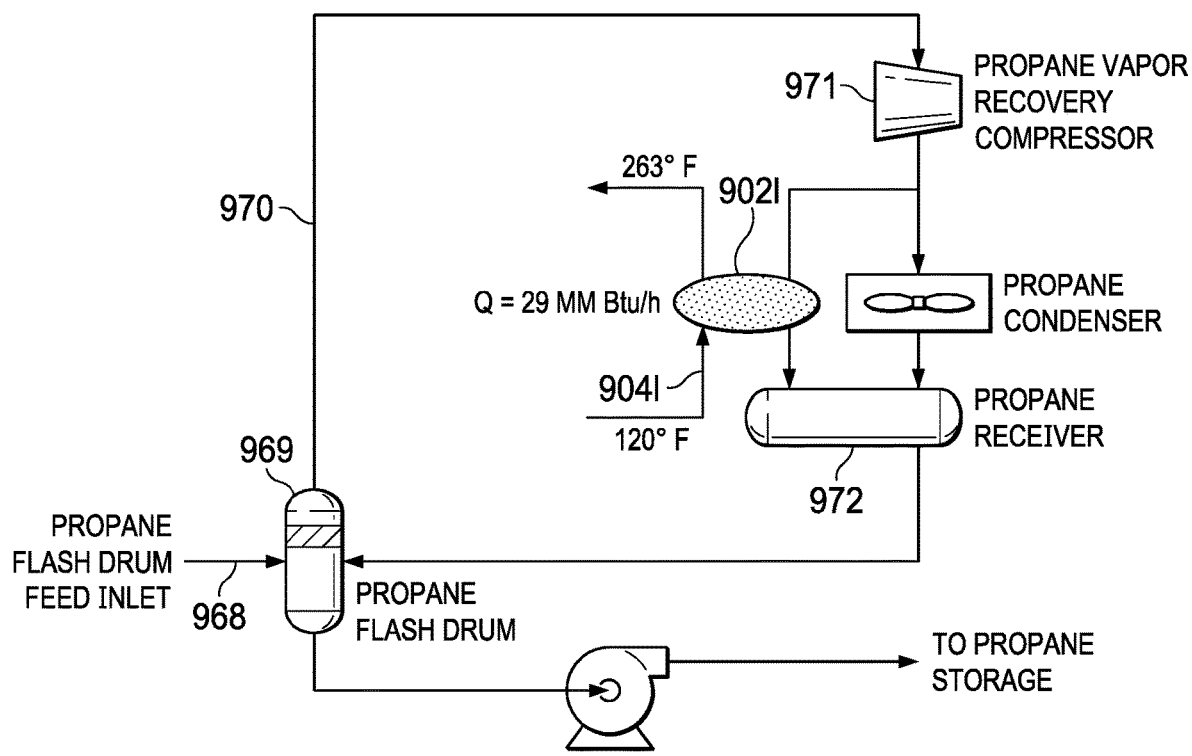
FIG. 1K is a diagram of a propane tank recovery section of a NGL fractionation plant.
Figure 1L:
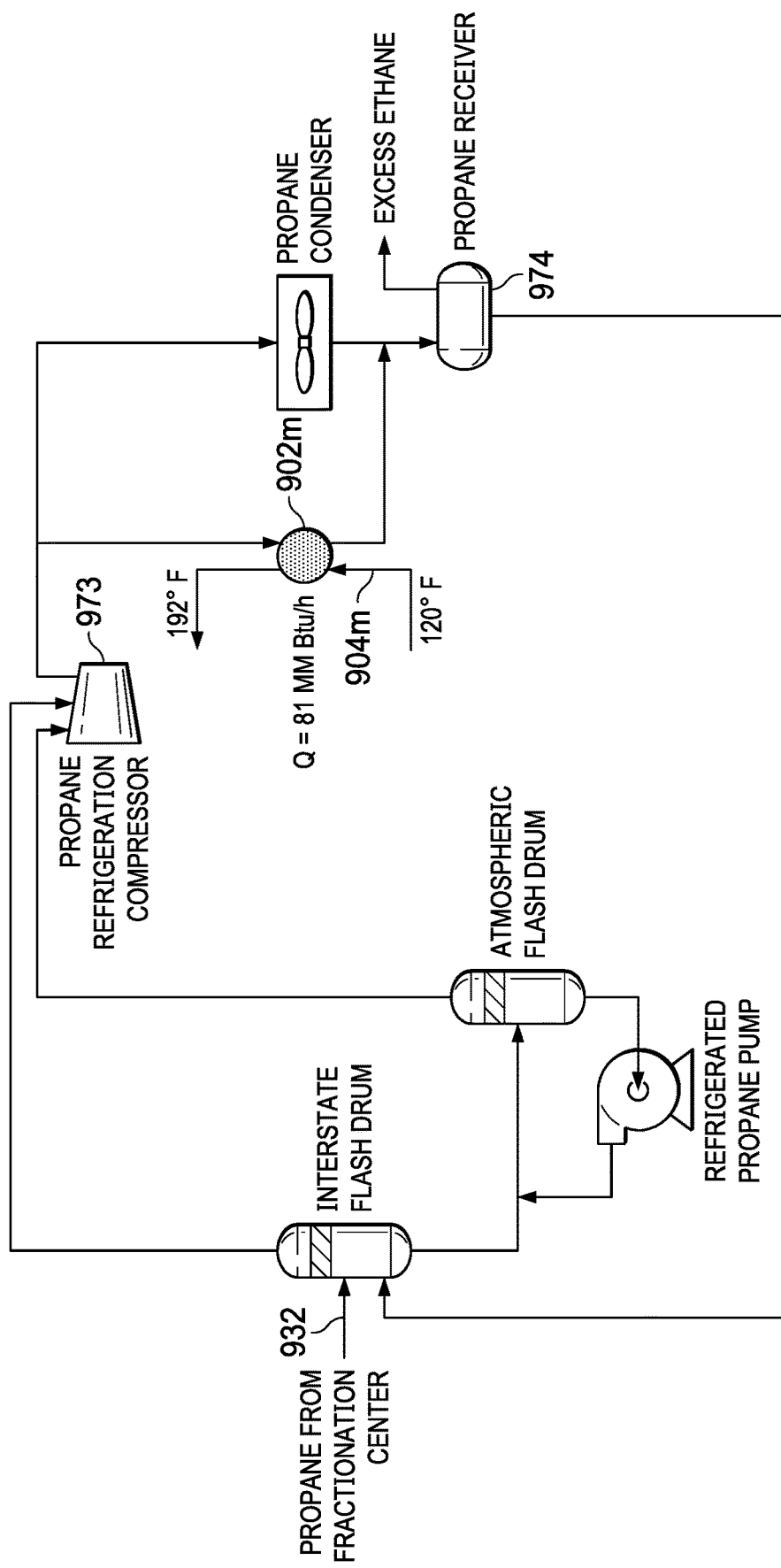
FIG. 1L is a diagram of a propane product refrigeration section of a NGL fractionation plant.

Referring to FIG. 1K, in a propane vapor recovery unit, propane 968 is received into a flash drum 969. A bottoms product of liquid propane is sent to propane storage. An overhead product 970 of propane vapor is compressed in a compressor 971 and cooled in the heat exchanger 902l by exchange with the stream 904l of buffer fluid. The cooled propane 970 is stored in a product drum 972 and returned to the flash drum 969. The presence of the heat exchanger 902l recovers waste heat from the propane vapor 970, enabling other components (for instance, cooling units or condensers) that would have been used to cool the propane vapor 970 to be bypassed or eliminated from the vapor recovery unit.

In some examples, the propane vapor 970 can be cooled. The stream 904l of buffer fluid can be heated to a temperature of between about 250° F. and about 270° F., such as about 250° F., about 260° F., about 263° F. or about 270° F. The thermal duty of the heat exchanger 904l can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Referring to FIG. 1L, in a propane refrigeration section, dry propane 932 from the propane dehydration section (FIG. 1E) is compressed in a compressor 973. The compressed dry propane 932 from the compressor 973 is cooled in the heat exchanger 902m by exchange with the stream 904m of buffer fluid. The cooled dry propane 932 is stored in a propane receiver 974. The presence of the heat exchanger 902m recovers waste heat from the dry propane 932, enabling other components (for instance, cooling units or condensers) that would have been used to cool the dry propane 932 to be bypassed or eliminated from the propane refrigeration section.

In some examples, the dry propane 932 can be cooled. The stream 904m of buffer fluid can be heated to a temperature of between about 190° F. and about 210° F., such as about 190° F., about 192° F., about 200° F., or about 210° F. The thermal duty of the heat exchanger 902m can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Figure 1M:
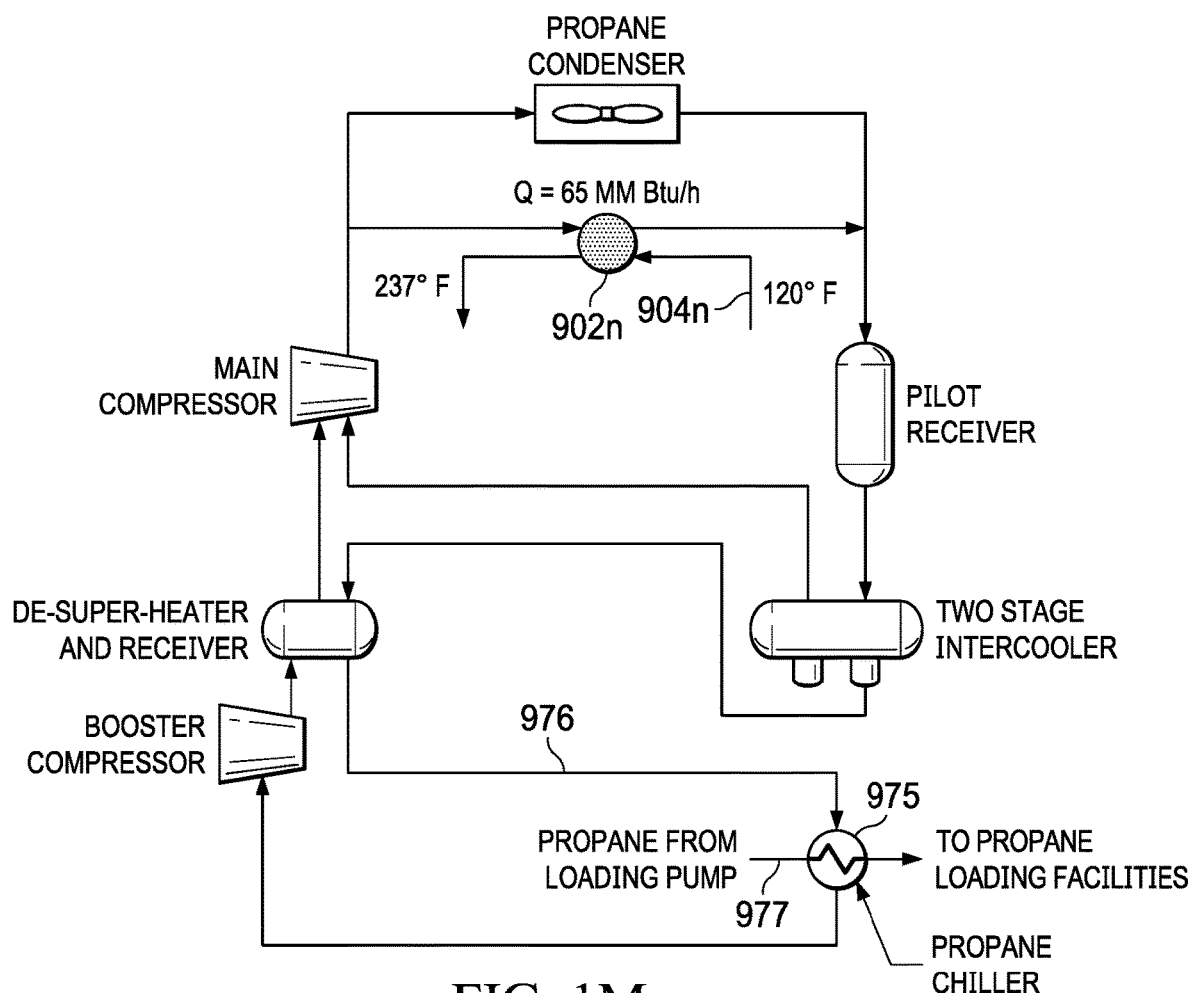
FIG. 1M is a diagram of a propane product sub-cooling section of a NGL fractionation plant.
Figure 1N:
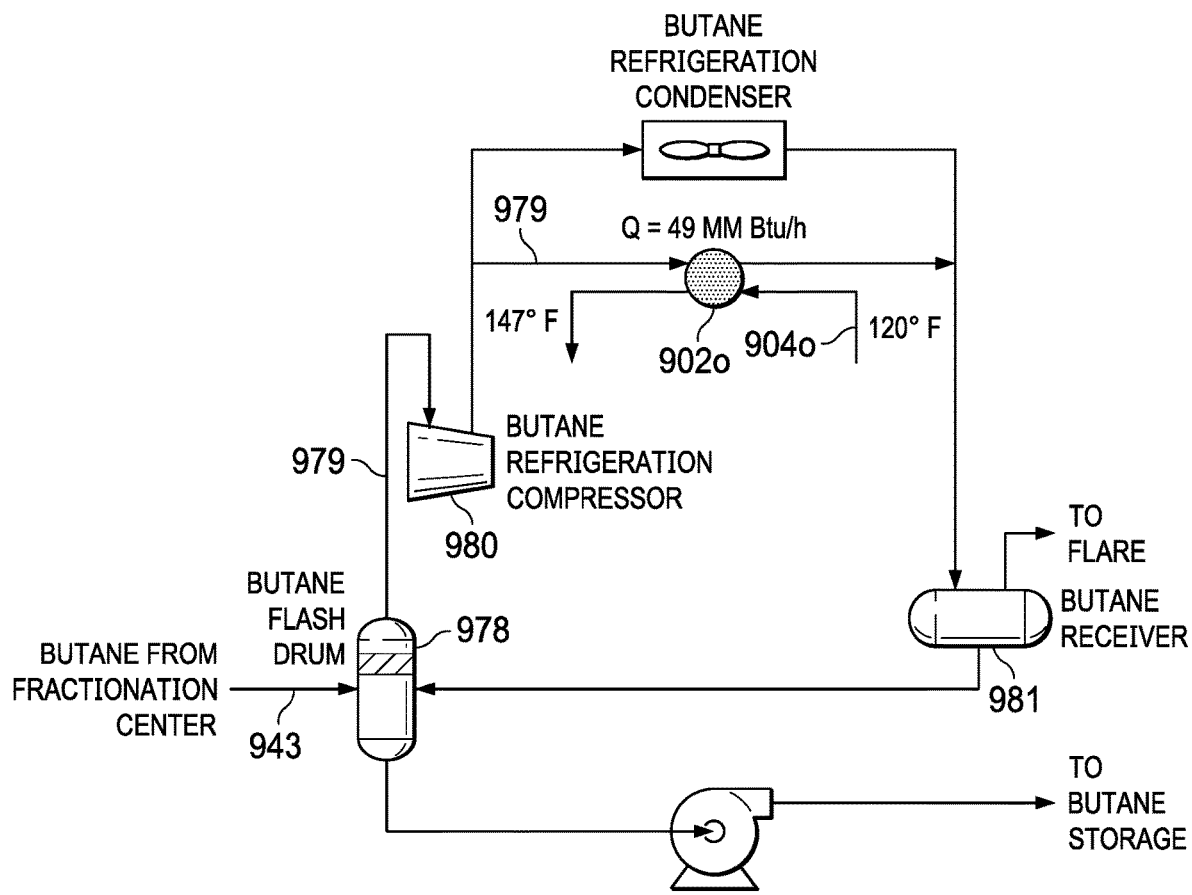
FIG. 1N is a diagram of a butane product refrigeration section of a NGL fractionation plant.

Referring to FIG. 1M, in some examples, propane product 977 can be sub-cooled in a propane product sub-cooling section by exchange in a propane chiller 975 with a cooling fluid 976. After cooling the propane product 977 in the propane chiller 975, the cooling fluid 976 is compressed and cooled in the heat exchanger 902n by exchange with the stream 904n of buffer fluid. The cooled cooling fluid 976 is returned to the propane chiller 975 for further propane cooling. The presence of the heat exchanger 902n recovers waste heat from the cooling fluid 976, enabling other components (for instance, cooling units or condensers) that would have been used to cool the cooling fluid 976 to be bypassed or eliminated from the propane product sub-cooling section.

In some examples, the cooling fluid 976 can be cooled. The stream 904n of buffer fluid can be heated to a temperature of between about 230° F. and about 250° F., such as about 230° F., about 237° F., about 240° F., or about 250° F. The thermal duty of the heat exchanger 902n can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Referring to FIG. 1N, in a butane refrigeration section, dry butane 943 from the butane dehydration section (FIG. 1G) is flashed in a flash drum 978. Liquid butane is sent to a storage. Butane gas 979 is compressed in a compressor 980 and the compressed dry butane 979 is cooled in the heat exchanger 902o by exchange with the stream 904o of buffer fluid. The cooled dry butane 979 is stored in a butane receiver 981. The presence of the heat exchanger 902o recovers waste heat from the dry butane 979, enabling other components (for instance, cooling units or condensers) that would have been used to cool the dry butane 979 to be bypassed or eliminated from the butane refrigeration section.

In some examples, the dry butane 979 can be cooled. The stream 904o of buffer fluid can be heated to a temperature of between about 140° F. and about 160° F., such as about 140° F., about 150° F., or about 160° F. The thermal duty of the heat exchanger 902o can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1O:
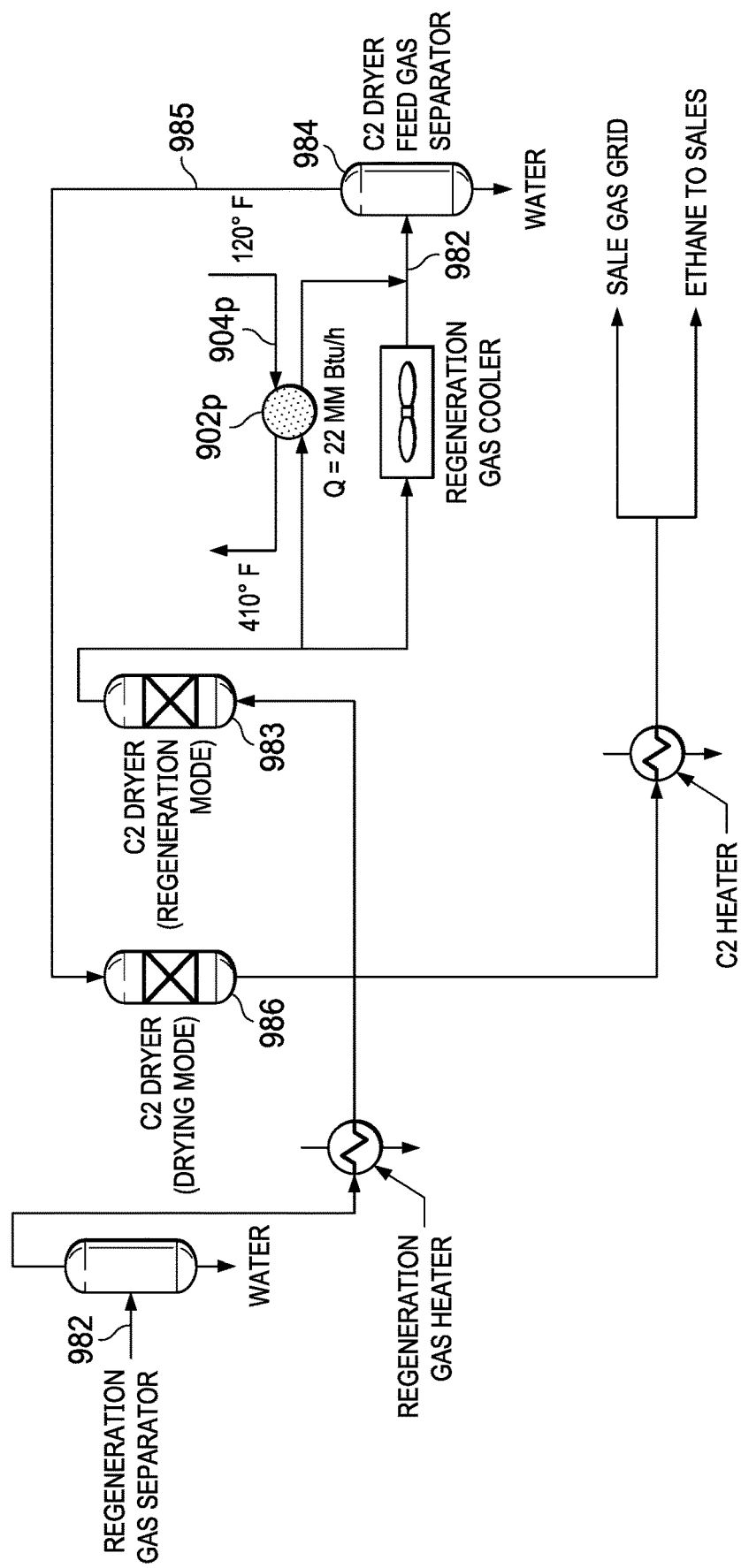
FIG. 1O is a diagram of an ethane production section of a NGL fractionation plant.
Figure 1P:
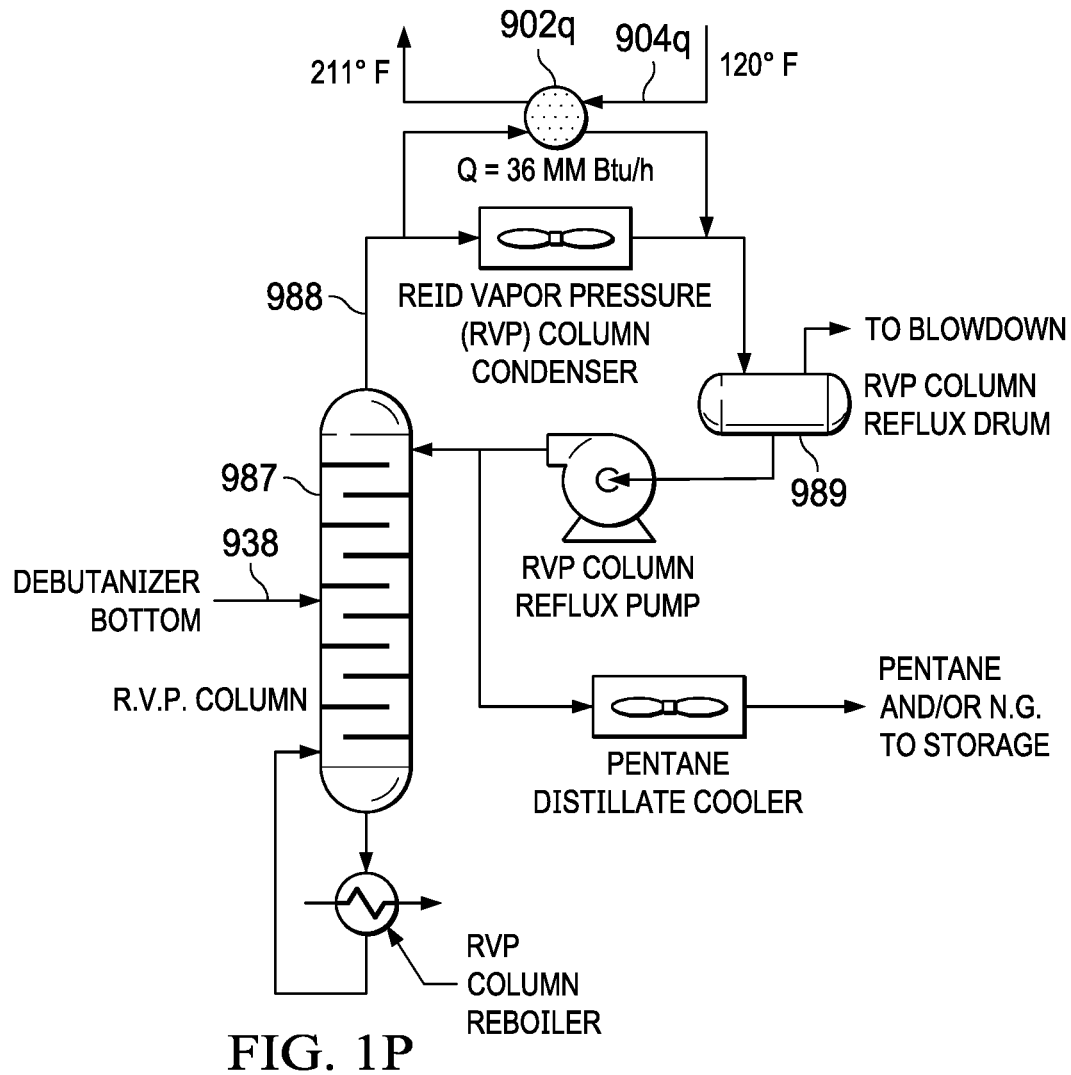
FIG. 1P is a diagram of a natural gasoline vapor section of a NGL fractionation plant.

Referring to FIG. 1O, in an ethane production section, ethane 982 is dried in a dryer 983 operating in a regeneration mode and cooled in the heat exchanger 902p by exchange with the stream 904p of buffer fluid. The cooled ethane 982 is separated in a feed gas separator 984 and ethane vapor 985 is further dried in a dryer 986 operating in a drying mode. Water is removed. Dry ethane output from the dryer 986 is heated and send to a sales gas grid or elsewhere. The presence of the heat exchanger 902p recovers waste heat from the ethane 982, enabling other components (for instance, cooling units or condensers) that would have been used to cool the ethane 982 to be bypassed or eliminated from the ethane production section.

In some examples, the ethane 982 can be cooled. The stream 904p of buffer fluid can be heated to a temperature of between about 400° F. and about 420° F., such as about 400° F., about 410° F., or about 420° F. The thermal duty of the heat exchanger 902p can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Referring to FIG. 1P, in an NG vapor pressure control section, debutanizer bottoms 938 from the debutanizer 935 (FIG. 1F) are received into an RVP column 987. An overhead stream of pentane 988 leaves the RVP column and is cooled in the heat exchanger 902q by exchange with the stream 904q of buffer fluid. The cooled pentane 988 is provided to a reflux drum 989. A portion of the liquid pentane from the reflux drum 989 is returned to the RVP column 987 and a portion is sent to storage. The presence of the heat exchanger 902q recovers waste heat from the pentane 988, enabling other components (for instance, cooling units or condensers) that would have been used to cool the pentane 988 to be bypassed or eliminated from the NG vapor pressure control section.

In some examples, the pentane 988 can be cooled. The stream 904q of buffer fluid can be heated to a temperature of between about 200° F. and about 220° F., such as about 200° F., about 210° F., or about 220° F. The thermal duty of the heat exchanger 902q can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

The systems described here can enable low-grade waste heat from the NGL fractionation plant to be used for carbon-free generation of power cooling capacity, enabling the NGL fractionation plant to be more energy efficient, less polluting, or both.

The network of heat exchangers described here can be integrated into an existing NGL fractionation plant as a retrofit or can be integrated into a newly constructed NGL fractionation plant. A retrofit to an existing NGL fractionation plant allows the efficiency, and fuel savings offered by the energy conversion systems described here to be accessible with a relatively low-capital investment. The energy conversion systems can make use of existing structure in an NGL fractionation plant while still enabling efficient waste heat recovery and conversion of waste heat to power and cooling capacity. The integration of an energy conversion system into an existing NGL fractionation plant can be generalizable to plant-specific operating modes.

Thus, particular implementations of the subject matter have been described. Other implementations are within the scope of the following claims.

The invention claimed is:

1. A system comprising:
a waste heat recovery heat exchanger configured to heat a buffer fluid stream by exchange with a heat source in a natural gas liquid fractionation plant; and
a modified Goswami cycle energy conversion system including:
one or more first energy conversion system heat exchangers configured to heat a working fluid by exchange with the heated buffer fluid stream;
a separator configured to receive the heated working fluid and to output a vapor stream of the working fluid and a liquid stream of the working fluid;
a turbine and a generator, wherein the turbine and generator are configured to generate power by expansion of a first portion of the vapor stream of the working fluid; and
a cooling subsystem including a first cooling element configured to cool a process fluid stream from the natural gas liquid fractionation plant by exchange with a condensed second portion of the vapor stream of the working fluid.

2. The system of claim 1, wherein the cooling subsystem is configured to produce at least 300 MM Btu/h of cooling capacity for the natural gas liquid fractionation plant.

3. The system of claim 1, wherein the first cooling element is configured to cool ethane gas output from a deethanizer in the natural gas liquid fractionation plant.

4. The system of claim 1, wherein the first cooling element comprises a chiller having a thermal duty of between 350 MM Btu/h and 450 MM Btu/h.

5. The system of claim 1, wherein the cooling subsystem comprises a second cooling element, the second cooling element comprising a cooler having a thermal duty of between 450 Btu/h and 550 Btu/h.

6. The system of claim 1, wherein the cooling subsystem comprises a second cooling element, the second cooling element comprising a valve.

7. The system of claim 6, wherein the valve is configured to condense the working fluid to a pressure of between 4 Bar and 5 Bar and a temperature of between 30° F. and 50° F.

8. The system of claim 1, wherein the turbine and generator are configured to generate at least 15 MW of power.

9. The system of claim 1, wherein the energy conversion system comprises a pump configured to pump the working fluid to a pressure of between 11 Bar and 12 Bar.

10. The system of claim 1, wherein the one or more first energy conversion heat exchangers comprise:

an energy conversion heat exchanger having a thermal duty of between 400 MM Btu/h and 500 MM Btu/h; and an energy conversion heat exchanger having a thermal duty of between 1000 MM Btu/h and about 1500 MM Btu/h.

11. The system of claim 1, wherein the one or more first energy conversion heat exchangers are configured to heat a first portion of the working fluid to a temperature of between 160° F. and 180° F.

12. The system of claim 1, wherein the one or more first energy conversion heat exchangers are configured to heat a first portion of the working fluid, and wherein the modified Goswami cycle energy conversion system comprises one or more second energy conversion heat exchangers configured to heat a second portion of the working fluid, wherein a first heat exchanger of the one or more second energy conversion heat exchangers is configured to heat the second portion of the working fluid by exchange with the liquid stream of the working fluid.

13. The system of claim 12, wherein the separator is configured to receive the heated first and second portions of the working fluid.

14. The system of claim 12, wherein a second heat exchanger of the one or more second energy conversion heat exchangers is configured to heat the second portion of the working fluid by exchange with the heated buffer fluid stream.

15. The system of claim 14, wherein:
the first heat exchanger of the one or more second energy conversion heat exchangers has a thermal duty of between 550 MM Btu/h and 650 MM Btu/h; and
the second heat exchanger of the one or more second energy conversion heat exchangers has a thermal duty of between 1100 MM Btu/h and about 1200 MM Btu/h.

16. The system of claim 12, wherein the one or more second energy conversion heat exchangers are configured to heat the second portion of the working fluid to a temperature of between 160° F. and 180° F.

17. The system of claim 1, comprising a second turbine configured to generate power from the liquid stream of the working fluid.

18. The system of claim 17, wherein the second turbine is configured to generate at least 1 MW of power.

19. The system of claim 17, wherein the second turbine comprises a high pressure recovery turbine.

20. The system of claim 1, comprising a storage tank, wherein the buffer fluid stream flows from the storage tank, through the waste heat recovery heat exchanger, through the modified Goswami cycle energy conversion system, and back to the storage tank.

21. The system of claim 1, wherein the waste heat recovery heat exchanger is configured to heat the buffer fluid stream by exchange with a refrigerant in the natural gas liquid fractionation plant.

22. The system of claim 21, wherein the refrigerant is used to cool ethane gas output from a deethanizer in the natural gas liquid fractionation plant.

23. The system of claim 1, wherein the waste heat recovery heat exchanger is configured to heat the buffer fluid stream by exchange with propane gas output from a depropanizer in the natural gas liquid fractionation plant.

24. The system of claim 1, wherein the waste heat recovery heat exchanger is configured to heat the buffer fluid stream by exchange with propane gas output from a propane dehydrator in the natural gas liquid fractionation plant.

25. The system of claim 1, wherein the waste heat recovery heat exchanger is configured to heat the buffer fluid stream by exchange with a C5+ bottoms product from a debutanizer in the natural gas liquid fractionation plant.

26. The system of claim 1, wherein the waste heat recovery heat exchanger is configured to heat the buffer fluid stream by exchange with butane gas output from a debutanizer in the natural gas liquid fractionation plant.

27. The system of claim 1, wherein the waste heat recovery heat exchanger is configured to heat the buffer fluid stream by exchange with butane gas output from a butane dehydrator in the natural gas liquid fractionation plant.

28. The system of claim 1, wherein the waste heat recovery heat exchanger is configured to heat the buffer fluid stream by exchange with pentane gas output from a depentanizer in the natural gas liquid fractionation plant.

29. The system of claim 1, wherein the waste heat recovery exchanger is configured to heat the buffer fluid stream by exchange with acid gases output from an amine-di-iso-propanol (ADIP) generator in the natural gas liquid fractionation plant.

30. The system of claim 1, wherein the waste heat recovery exchanger is configured to heat the buffer fluid stream by exchange with lean ADIP output from an ADIP generator in the natural gas liquid fractionation plant.

31. The system of claim 1, wherein the waste heat recovery exchanger is configured to heat the buffer fluid stream by exchange with light natural gas (NG) components output from a pre-flash drum in a decolorizing section of the natural gas liquid fractionation plant.

32. The system of claim 1, wherein the waste heat recovery exchanger is configured to heat the buffer fluid stream by exchange with NG output from a decolorizer in the natural gas liquid fractionation plant.

33. The system of claim 1, wherein the waste heat recovery exchanger is configured to heat the buffer fluid stream by exchange with compressed propane in the natural gas liquid fractionation plant.

34. The system of claim 1, wherein the waste heat recovery exchanger is configured to heat the buffer fluid stream by exchange with compressed butane in the natural gas liquid fractionation plant.

35. The system of claim 1, wherein the waste heat recovery exchanger is configured to heat the buffer fluid stream by exchange with dry ethane gas in the natural gas liquid fractionation plant.

36. The system of claim 1, wherein the waste heat recovery exchanger is configured to heat the buffer fluid stream by exchange with pentane gas output from a Reid vapor pressure (RVP) column in the natural gas liquid fractionation plant.

37. A method comprising:
heating a buffer fluid stream via a waste heat recovery heat exchanger by exchange with a heat source in a natural gas liquid fractionation plant;
generating power and cooling capacity in a modified Goswami cycle energy conversion system, comprising:
heating a first portion of a working fluid via a first set of one or more energy conversion heat exchangers by exchange with the heated buffer fluid stream;
heating a second portion of a working fluid via a second set of one or more energy conversion heat exchangers, including heating the second portion of the working fluid via a first heat exchanger by exchange with a liquid stream of the working fluid;

separating, in a separator, the heated first and second portions of the working fluid into a vapor stream of the working fluid and the liquid stream of the working fluid;

generating power, by a turbine and generator, by expansion of a first portion of the vapor stream of the working fluid; and cooling a process fluid stream from the natural gas liquid fractionation plant by exchange with a condensed second portion of the vapor stream of the working fluid.

38. The method of claim 37, wherein cooling the process fluid stream comprises producing at least 300 MM Btu/h of cooling capacity for the natural gas liquid fractionation plant.

39. The method of claim 37, wherein cooling the process fluid stream comprises cooling ethane gas output from a deethanizer in the natural gas liquid fractionation plant.

40. The method of claim 37, where generating power by the turbine and generator includes generating at least 15 MW of power.

41. The method of claim 37, comprising pumping the working fluid to a pressure of between 11 Bar and 12 Bar.

42. The method of claim 37, wherein heating the first portion of the working fluid comprises heating the first portion of the working fluid to a temperature of between 160° F. and 180° F.

43. The method of claim 37, wherein heating the second portion of the working fluid comprises heating the second portion of the working fluid to a temperature of between 160° F. and 180° F.

44. The method of claim 37, comprising generating power from the liquid stream of the working fluid by a second turbine.

45. The method of claim 44, wherein generating power by the second turbine comprises generating at least 1 MW of power.

46. The method of claim 37, comprising flowing the buffer fluid stream from a storage tank, through the waste heat recovery exchanger, through the modified Goswami cycle energy conversion system, and back to the storage tank.

47. The method of claim 37, wherein the waste heat recovery heat exchanger is configured to heat the buffer fluid stream by exchange with a refrigerant in the natural gas liquid fractionation plant.

48. The method of claim 47, wherein the refrigerant is used to cool ethane gas output from a deethanizer in the natural gas liquid fractionation plant.

49. The method of claim 37, wherein heating the buffer fluid stream comprises heating the buffer fluid stream by exchange with propane gas output from a depropanizer in the natural gas liquid fractionation plant.

50. The method of claim 37, wherein heating the buffer fluid stream comprises heating the buffer fluid stream by exchange with propane gas output from a propane dehydrator in the natural gas liquid fractionation plant.

51. The method of claim 37, wherein heating the buffer fluid stream comprises heating the buffer fluid stream by exchange with a C5+ bottoms product from a debutanizer in the natural gas liquid fractionation plant.

52. The method of claim 37, wherein heating the buffer fluid stream comprises heating the buffer fluid stream by exchange with butane gas output from a debutanizer in the natural gas liquid fractionation plant.

53. The method of claim 37, wherein heating the buffer fluid stream comprises heating the buffer fluid stream by exchange with butane gas output from a butane dehydrator in the natural gas liquid fractionation plant.

54. The method of claim 37, wherein heating the buffer fluid stream comprises heating the buffer fluid stream by exchange with pentane gas output from a depentanizer in the natural gas liquid fractionation plant.

55. The method of claim 37, wherein heating the buffer fluid stream comprises heating the buffer fluid stream by exchange with acid gases output from an ADIP generator in the natural gas liquid fractionation plant.

56. The method of claim 37, wherein heating the buffer fluid stream comprises heating the buffer fluid stream by exchange with lean ADIP output from an ADIP generator in the natural gas liquid fractionation plant.

57. The method of claim 37, wherein heating the buffer fluid stream comprises heating the buffer fluid stream by exchange with light NG components output from a pre-flash drum in a decolorizing section of the natural gas liquid fractionation plant.

58. The method of claim 37, wherein heating the buffer fluid stream comprises heating the buffer fluid stream by exchange with NG output from a decolorizer in the natural gas liquid fractionation plant.

59. The method of claim 37, wherein heating the buffer fluid stream comprises heating the buffer fluid stream by exchange with compressed propane in the natural gas liquid fractionation plant.

60. The method of claim 37, wherein heating the buffer fluid stream comprises heating the buffer fluid stream by exchange with compressed butane in the natural gas liquid fractionation plant.

61. The method of claim 37, wherein heating the buffer fluid stream comprises heating the buffer fluid stream by exchange with dry ethane gas in the natural gas liquid fractionation plant.

62. The method of claim 37, wherein heating the buffer fluid stream comprises heating the buffer fluid stream by exchange with pentane gas output from an RVP column in the natural gas liquid fractionation plant.

* * * * *